United States Patent [19]

Ankney et al.

[11] Patent Number: 5,113,499
[45] Date of Patent: May 12, 1992

[54] TELECOMMUNICATION ACCESS MANAGEMENT SYSTEM FOR A PACKET SWITCHING NETWORK

[75] Inventors: Richard C. Ankney, Chantilly; Ronald P. Bonica, Falls Church, both of Va.; Douglas E. Kay, Chevy Chase, Md.; Patricia A. Pashayan, Herndon; Roy L. Spitzer, Vienna, both of Va.

[73] Assignee: Sprint International Communications Corp., Reston, Va.

[21] Appl. No.: 344,905

[22] Filed: Apr. 28, 1989

[51] Int. Cl.⁵ .................................. G06F 13/14
[52] U.S. Cl. ........................ 395/325; 364/DIG. 1; 364/286.5; 364/282.1; 364/284.1; 364/242.94; 395/725
[58] Field of Search ... 364/200 MS File, 900 MS File

[56] References Cited

U.S. PATENT DOCUMENTS

| | | | |
|---|---|---|---|
| 4,604,686 | 8/1986 | Reiter et al. | 364/200 |
| 4,718,005 | 1/1988 | Feigenbaum et al. | 364/200 |
| 4,799,153 | 1/1989 | Hann et al. | 364/200 |

Primary Examiner—Thomas M. Heckler
Attorney, Agent, or Firm—Leitner, Greene & Christensen

[57] ABSTRACT

A security access management system for a packet switched data communications network has access management apparatus operatively associated with the packet switches at each entry point of the network. The access management apparatus includes an administrative host processor for examining user terminal authorization information in packets received at the associated packet switch for transmission through the network to destination addresses for the packets. A database associated with the administrative host stores information including levels of authorization of the user terminals for the respective entry point of the network for access to specified destinations, as pre-assigned by the network customer. Also included in the access management apparatus is a validation host processor which responds to comparisons between the user terminal authorization information contained in the packet and the pre-assigned level of authorization for the same user terminal, and, if they correspond, to grant access by that user terminal through the associated packet switch to the destination address with which a communication session is requested; or, if they differ, to deny such access. The access management apparatus is located remote from the user terminals using the particular entry point for the network.

12 Claims, 14 Drawing Sheets

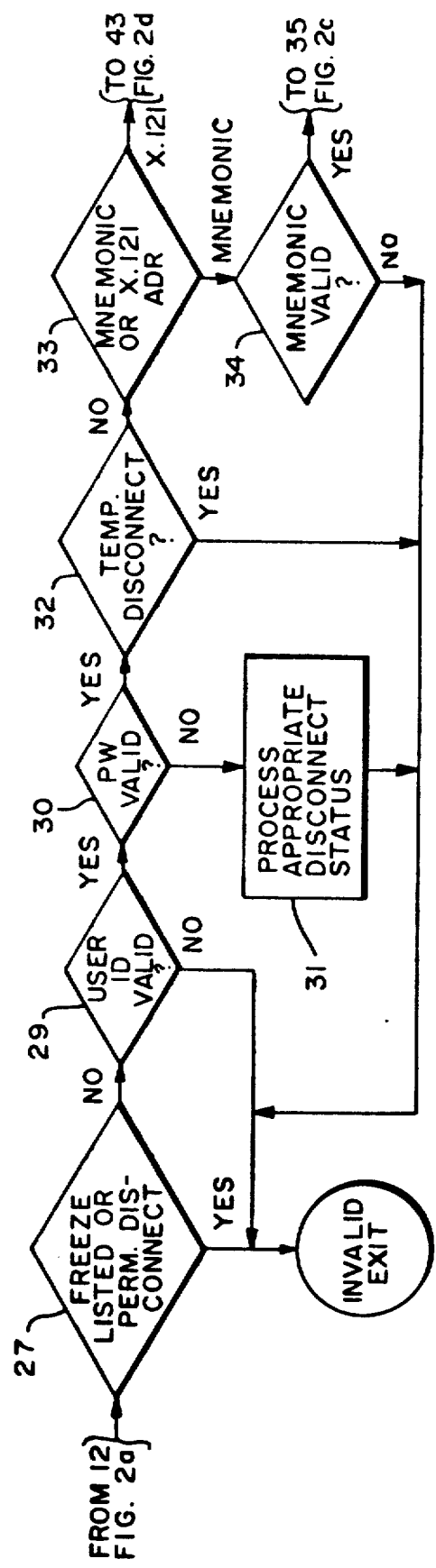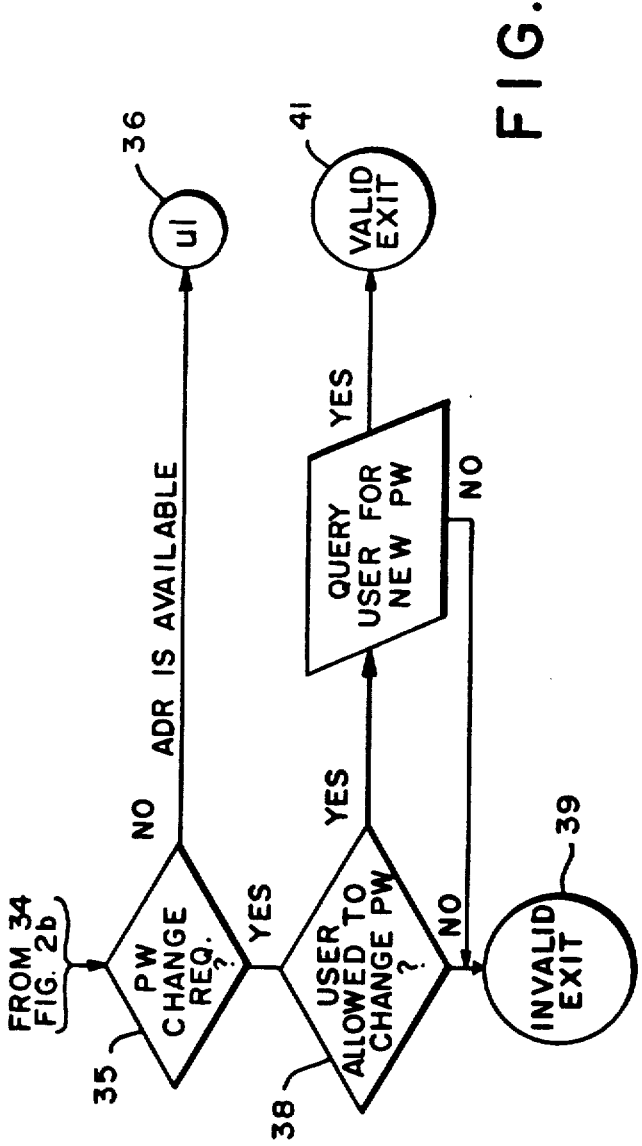
FIG. 2b
FIG. 2c

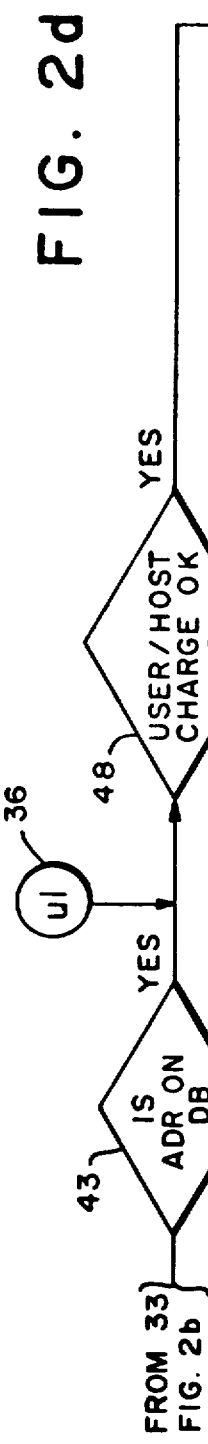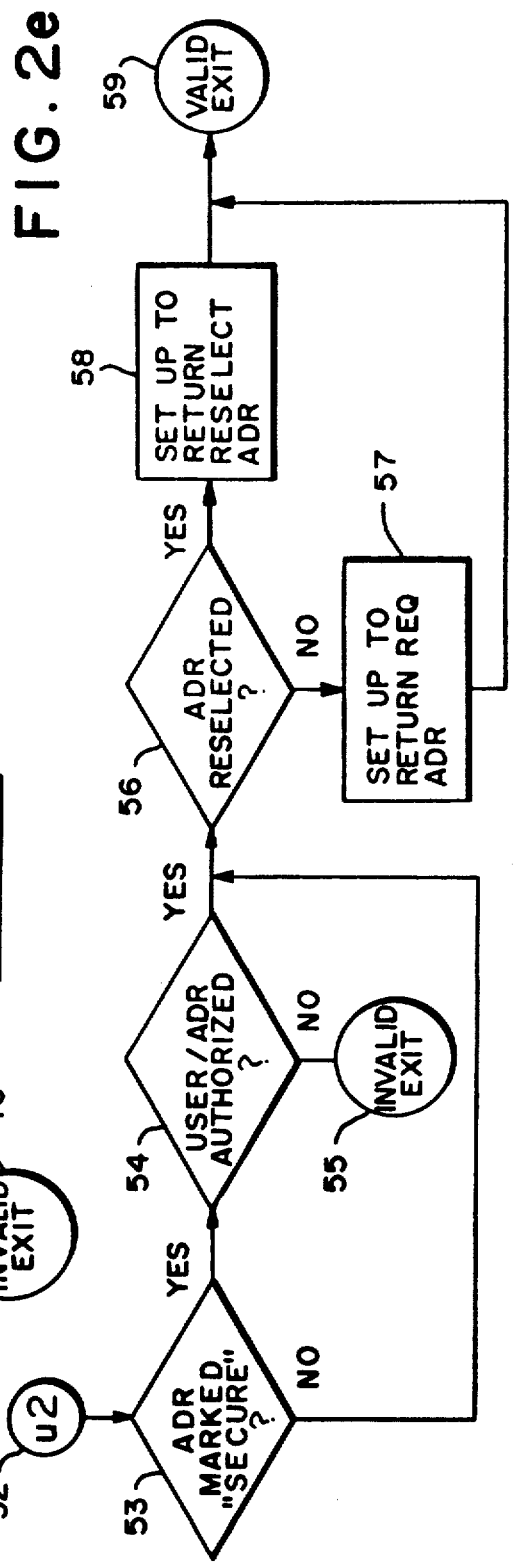

TELECOMMUNICATION ACCESS MANAGEMENT SYSTEM FOR A PACKET SWITCHING NETWORK

BACKGROUND OF THE INVENTION

The present invention relates generally to data communication networks, and more particularly to a system for managing access by users and host computers at least certain destinations which may be other users or hosts within a packet switching network.

In packet switching networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch. Data concentrators have also been developed to interface with hosts and to route packets along the network. In essence, data concentrators serve to switch a number of lightly used links onto a smaller number of more heavily used links. They are often used in conjunction with, and ahead of, the packet switch.

In virtual circuit (VC) or connection-oriented transmission, packet-switched data transmission is accomplished via predetermined end-to-end paths through the network, in which user packets associated with a great number of users share link and switch facilities as the packets travel over the network. The packets may require storage at nodes between transmission links of the network until they may be forwarded along the respective outgoing link for the overall path. In connectionless transmission, another mode of packet-switched data transmission, no initial connection is required for a data path through the network. In this mode, individual datagrams carrying a destination address are routed through the network from source to destination via intermediate nodes, and do not necessarily arrive in the order in which they were transmitted.

The widely-used Telenet public packet switching network routes data using a two-level hierarchy. The hierarchy comprises a long distance-spanning backbone network with a multiplicity of nodes or hubs, each of which utilizes a cluster of backbone switches; and smaller geographic area networks with backbone trunks, access lines and clustered lower level switches connected to each hub. Packet-switched data is transmitted through the network via VCs, using CCITT (International Telegraph and Telephone Consultative Committee of the International Telecommunications Union) X.75 protocol, which is a compatible enhancement of X.25 protocol.

For a communication session to proceed between the parties to a connection, it is essential that data be presented in a form that can be recognized and manipulated. The sequence of required tasks at each end, such as the format of the data delivered to a party, the rate of delivery of the data, and resequencing of packets received out of order, is generally handled in an organized manner using layered communication architectures. Such architectures address the two portions of the communications problem, one being that the delivery of data by an end user to the communication network should be such that the data arriving at the destination is correct and timely, and the other being that the delivered data must be recognizable and in proper form for use. These two portions are handled by protocols, or standard conventions for communication intelligently, the first by network protocols and the second by higher level protocols. Each of these protocols has a series of layers. Examples of layered architectures include the Systems Network Architecture (SNA) developed by IBM, and the subsequently developed Open Systems Interconnection (OSI) reference model. The latter has seven layers, three of which are network services oriented including physical, data link, and network layers, and the other four providing services to the end user by means of transport, session, presentation, and application layers, from lowest to highest layer.

X.25 is an interface organized as a three-layered architecture for connecting data terminals, computers, and other user systems or devices, generally refereed to as data terminal equipment (DTE), to a packet-switched network through data circuit terminating equipment (DCE) utilized to control the DTE's access to the network. The three layers of the X.25 interface architecture are the physical level, the frame level and the packet level. Although data communication between DCEs of the network is routinely handled by the network operator typically using techniques other than X.25, communication between the individual user system and the respective DCE with which it interfaces to the network is governed by the X.25 or similar protocol. In essence, X.25 establishes procedures for congestion control among users, as well as call setup (or connect) and call clearing (or disconnect) for individual users, handling of errors, and various other packet transmission services within the DTE-DCE interface.

X.25 is employed for virtual circuit (VC) connections, including the call setup, data transfer, and call clearing phases. Call setup between DTEs connected to the network is established by one DTE issuing an X.25 call-request packet to the related DCE, the packet containing the channel number for the logical connections, the calling and called DTE addresses, parameters specifying the call characteristics, and the data. The destination DCE issues an incoming call packet, which is of the same general format as the call-request packet, to the destination DTE, the latter replying with a call-accepted packet. In response, the calling DCE issues a call-connected packet to its related DTE. At that point the call is established and the data transfer phase may begin by delivery of data packets. When the call is compared, i.e., the session is to end, a call-clearing procedure is initiated.

Prospective routing paths in the network are initially determined by a network control center, which then transmits these predetermined paths to the backbone switches as routing tables consisting of primary and secondary choices of available links from each hub. The secondary choices are viable only in the event of primary link failures, and the specific secondary link selection is a local decision at the respective hub based principally on current or recent traffic congestion patterns. The unavailability of an outgoing link from a hub at the time of the call setup effects a clearing back of the VC for the sought call to the preceding hub. An alternative link is then selected by that hub, or, if none is available there, the VC circuit is again cleared back to the next preceding hub, and so forth, until an available path is uncovered from the routing tables. Messages concerning link and/or hub failures are communicated immediately to the network control center, and that information is dispatched to the rest of the network by the center.

In typical present-day concentrators and packet switches, the data processing devices reside in plurality of cards or boards containing printed circuits or integrated circuits for performing the various functions of the respective device in combination with the system software. Typically, the cards are inserted into designated slots in cages within a console, with backplane access to a data bus for communication with one another or to other devices in the network. The VME bus is presently the most popular 16/32-bit backplane bus. References from time to time herein to cards or boards will be understood to mean the various devices embodied in such cards or boards.

Many public data networks (PDNs) offer little or no security for communications between users and hosts or other data processing devices within the network, in keeping with the "public purpose" of the network and the desire for accessibility by a large number of actual and prospective users. Where restrictions on access are necessary or desirable, it is customary to assign each authorized user an identification (ID) number or a password, or both, which must be used to gain access to the host. More elaborate security measures are necessary where access may be had to highly confidential data.

Some data communication networks involve a variety of different customers each of whom makes available a host and one or more databases to its users, and may place a level if security on its database which differs from the level placed by other customers on their respective hosts and databases. In those instances, it is customary to make the host responsible for security and access to itself and its associated database. Thus, a user might have access to certain destinations in the network without restriction, but no access to other destinations.

It may happen that an intruder, i.e., an unauthorized user, is able to enter the network by dialing up a desired host, and then attempts to make calls (i.e., to access) a desired destination through an iterative process using large numbers of IDs or passwords. Hackers have been known to run long routines of potential passwords for days on end while leaving a terminal unattended, with the exception that upon return to the terminal, entry to the host and the database may have been successful. These techniques not only violate network security, but also tie up lines otherwise available to authorized users. If toll lines are involved, the intruder may cost the network or its customers many hundreds or thousands of dollars of network time, whether or not the intruder is ultimately able to gain access to the host and its database.

In the past, various techniques and systems have been employed to provide secure data communications. U.S. Pat. No. 4,317,957 to Sendrow describes a security system for an electronic funds transfer network in which proposed transactions entered at remote terminals are multiply-enciphered in a predetermined manner with user identification and other secret information. Data is re-enciphered into another key and, together with this secret information, is appended to a transaction request message and transmitted to a central computer for validation. Such a technique does not readily alleviate the problem of dealing with many different levels of users within a data network, or of precluding an intruder from obtaining initial access and running a routine to penetrate further into the network's confidential archives. The Sendrow system is of the type in which any user may obtain access to the network, and the host has the responsibility for validation of the user's authorization to go further.

U.S. Pat. No. 4,423,287 to Zeidler describes a so-called "end-to-end" encryption system for protecting certain critical elements of messages used to obtain cash in automated financial transactions, such as transactions involving ATMs or other cash dispensing systems. In the Zeidler system, one-time session keys are implemented to assure that all encrypted data and message authentiacation codes are different notwithstanding identical transactions. The system requires multiple sequential encryptions and decryptions of session keys in master keys. Critical elements of the data message, such as a PIN, are encrypted using a session key which itself is decrypted using a master key, and then a message authentication code is computed using the same session key for other data elements of the message. An acquirer station with which a plurality of user terminals are associated attaches another master key-encrypted session key to the already encrypted data from an associated terminal. The multiply-encrypted data is then transmitted to a host via a network switch which inserts yet another master key for encryption. An issuer receives the last encrypted message and decrypts it with a final master key. Such a security system is generally unsuitable for a public data communications network, simply because it is overly complex and does not allow for different levels of security or different levels of users.

U.S. Pat. No. 4,430,728 to Beitel discloses a system for secure communications using a security key for automatic operation of a modem hookup for communication between the calling and called modems. If a security key contains the proper code, a switch is activated by the called modem to connect the caller to the host. Here again, although the technique employed is relatively less complex than those described above, the prior art system does no readily distinguish between different levels of security or different levels of users within the same network.

U.S. Pat. No. 4,349,695 to Morgan describes an authentication system in which the receiver interrogates the transmitter in code. Multiple back and forth transmissions are required to authenticate the remote user. Such systems likewise do not take into account the various levels of users and security within a single network. While the interrogation of certain users may be appropriate, for others it is a waste of valuable network time.

It will be observed, therefore, that a need exists for a relatively simple security and access management system that may be implemented in an existing data communication network in which certain users may be authorized for unlimited access to hosts and databases, while others have more restricted access, and still others are to be denied access to specified portions of the network but free access to other portions. It is a principal object of the present invention to provide such an access management system.

It is another object of the present invention to provide an access management system for a data communications network which precludes intruders from gaining initial access to the network itself and thus improves the level of overall security, but without imposing harsh or cumbersome measures of accessibility or interrogation on authorized users of every level.

Still another object of the invention is to provide an access management system which precludes iterative techniques for stumbling on valid passwords or other entry-authorizing codes to the data communications network, without establishing unnecessarily strict barriers to entry by the various levels of authorized users of the network.

SUMMARY OF THE INVENTION

According to the present invention, a data network access management system is configured at each entry point to the packet switching network, in proximity to the user's DTE and specifically on a PC. In the packet-switched system, DTEs include or are associated with respective Packet Assembler/Disassembler devices (PADs). In the case of an asynchronous (asyn) user, for example, desiring access to a particular host, the call request typically includes the destination address of the host, as well as the user's ID and password (and perhaps a second password). The user's PAD assimilates this information and assembles it into a standard request packet.

The request packet is transmitted from the user's DTE to a packet switch, which makes decisions on routing of calls and responses, and priority of data communications within that portion of the data network with which it is associated. In the case of an async user request packet, the switch detects from the information contained in the packet the need for user validation. That is, the switch assesses the request packet, and, finding that certain information required by the system of the present invention is either absent or incomplete, the switch dispatches a call request to the total access management system (TAMS) of the present invention.

The TAMS includes an administrative host (AH) which maintains an associated relational data base, and a validation host which runs through various scenarios to determine whether the particular call request packet (CR packet) has been communicated from a pre-authorized user (i.e., a user which the customer of the network provider has predesignated as authorized to request and obtain access from one or more hosts maintained by that network customer), or whether the user's authority must be validated on each request. In the case of an async user, each attempt to enter the network requires validation by the TAMS. It is important to note that according to the present invention the initial determination of a need for validation is made by the switch at a point of entry to the network, and not at the user's terminal (or, more specifically, by some form of terminal security device) as may be found in various prior art systems which all too often are readily circumvented by an unauthorized user.

If the TAMS determines that the CR (and hence, the user) is valid, it proceeds to issue what will be referred to herein as a call forward on clear (CFOC) which, in essence, indicates the TAMS validation of the user in question to the switch, and clears the message back for access by that user to the addressed host. The call from the user is not accepted as such by the TAMS; it is merely cleared to inform the switch that this particular user request is validated and that communications may now ensue between the user and the addressed host. In turn, the switch proceeds to make the connection required for that communications path, the host accepts the call (which may depend on additional interrogation of the user by that host—or by a separate host security device—as found in various prior art systems, and which forms no part of the present invention), and that acceptance is communicated to the user's terminal.

The assembly of data at the terminals (or at a PAD remote from but associated with the terminal) into a CR packet, and the intercommunication between the switch and the TAMS are transparent to the user. After the ID and other pertinent data are entered at the terminal, an approval or denial of transmission is visually indicated (typically on a CRT monitor) at the terminal. As noted above in the background section of this document, in many prior art data communications systems each host may have its own security system. If the user is able to enter the network and knows (or thereafter uncovers) the host address, he may simply "dial up" the host and the host then assumes the responsibility for validating that user. However, with the TAMS system according to the invention, security is established at the point of entry to the network so that the user cannot even enter the network (except in certain special situations to be discussed hereinafter) to reach the host without being referred to and validated by the TAMS. If the CR packets is not validated, the message from TAMS back to the switch causes an immediate disconnect of the user's terminal.

Thus, among other advantages the invention precludes an unauthorized user from reaching a host in a data communications network, and hence precludes the situation in which the user may thereafter use an iterative technique to uncover an acceptable ID and/or password to penetrate the hosts's database. Indeed, according to a feature of the TAMs system of the present invention, means are included for logging the number of invalid attempts at access from a particular terminal or line within a predetermined time, and for initiating a temporary disconnect of the user if that number exceeds a preselected number. This is to take into account a reasonable number of errors in entry by an authorized user. After expiration of the temporary disconnect, the switch allows reconnection thereto from the user in question. However, if this is followed by another (one or more, as preselected) series of invalid attempts at access by the same user (same terminal or line), a permanent disconnect is effected. In that instance, reconnection is permitted only after a physical investigation of the circumstances that surrounded the permanent disconnect, and a clearing of the particular user/terminal/line.

The system according to the present invention permits existing networks to enjoy upgraded security or to impose security where none existed before, without substantial change to existing network terminals, lines, hosts, devices or subsystems. If desired by the network customer, certain users may be pre-authorized to gain access to a designated host or hosts without need for validation by TAMS. In such instances, the switch recognizes the pre-authorization and determines therefrom that no inquiry to TAMS is necessary. Therefore, it will be noted that the present invention may accommodate the needs of many different network customers regarding user access and security (or the lack thereof) within a public data network, in a relatively simple, efficient and cost-effective manner and without requiring individual customers or device manufacturers to modify their hardware or software.

Accordingly, it is yet another object of the present invention to provide an access management system for a public data communications network, in which access management with respect to users and hosts of different customers of the network is performed at an entry point to the network which is remote from both the user's terminal and the host computer to which the access is sought.

Still another object of the present invention is to provide an access management system of the above-described type in which invalid attempts at access are logged with respect to a particular user, terminal or line, and a predetermined number of successive invalid attempts automatically results in a disconnect of the user, terminal or line to preclude numerous iterations of attempts to break an identification code, password or other security measure.

In the TAMS system, four major functions are provided to asynchronous users: (i) user ID validation, (ii) address pair validation, (iii) address (mnemonic) translation, and (iv) password change. User ID validation compares the entered user ID and password against data in the TAMS data base, and, if valid, a further check may be made to verify permitted access by the user to the requested destination. The validation information may be present in the call request or may be obtained interactively. Address pair validation compares the calling address against a list of valid addresses that may place calls to the requested destination, and is used for callers which do not directly interact with the PAD at call setup and which, therefore, have no user ID associated with them. Mnemonic addressing capability is provided for single-transaction validation, in which the user may enter a mnemonic (i.e., a "user friendly" alphanumeric name for a network resource, e.g., a host) rather than a numeric destination, the call then being forwarded to a validation host (VH) which translates the mnemonic to the appropriate numeric address, performs the required call validation, and forwards the call to the requested destination. Finally, asynchronous users may change their passwords by entering a special mnemonic representing the password change application.

BRIEF DESCRIPTION OF THE DRAWINGS

The above and other objects, aspects, features and advantages of the present invention will become more apparent from a consideration of the ensuing detailed description of a presently preferred embodiment thereof, taken together with the accompanying drawings, in which.

DETAILED DESCRIPTION OF THE PREFERRED EMBODIMENT

Figure 1:
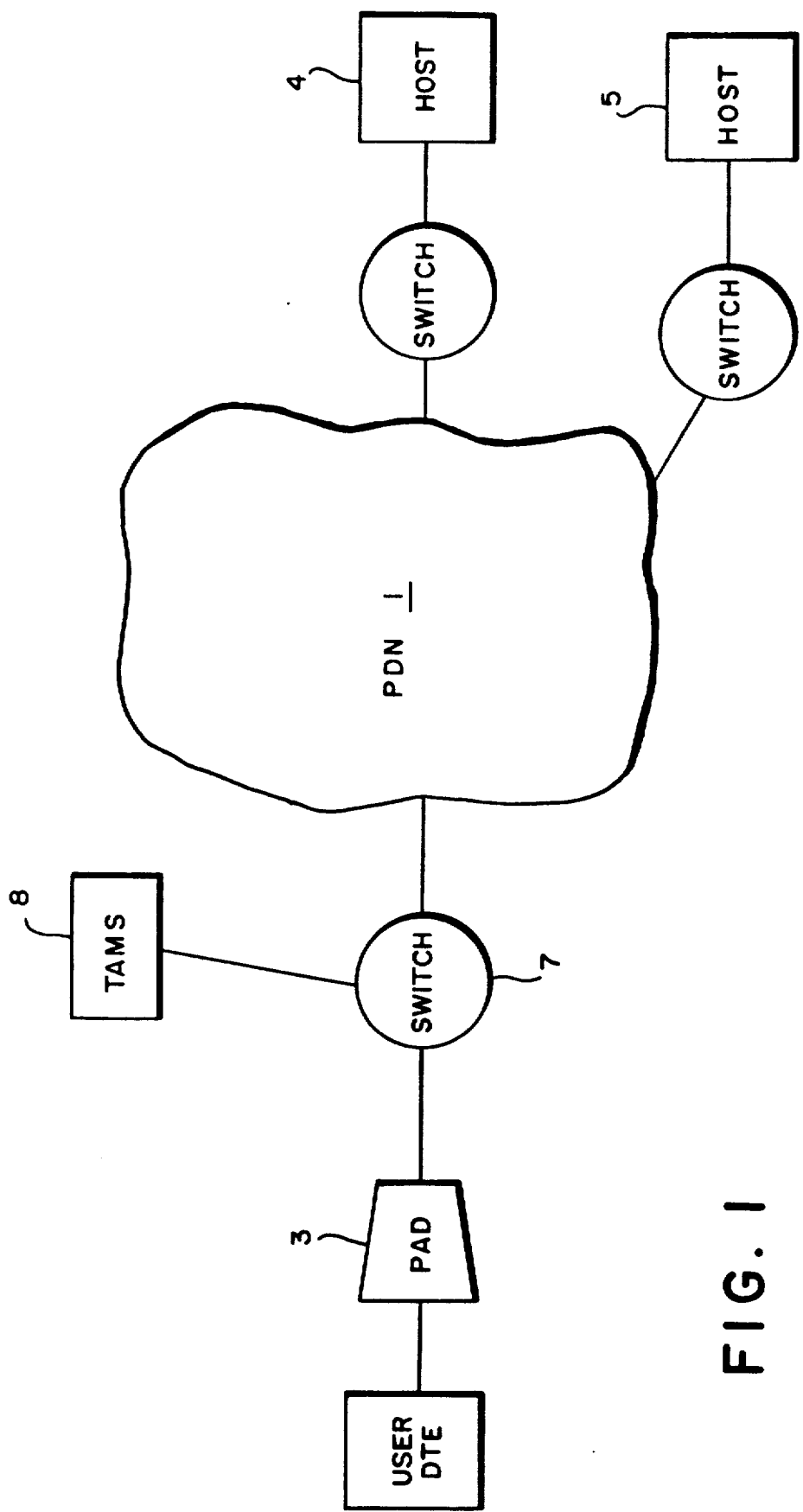
FIG. 1 is a simplified block diagram of a public data communications network useful for purposes of the description of a presently preferred embodiment of the invention.
Figure 2A:
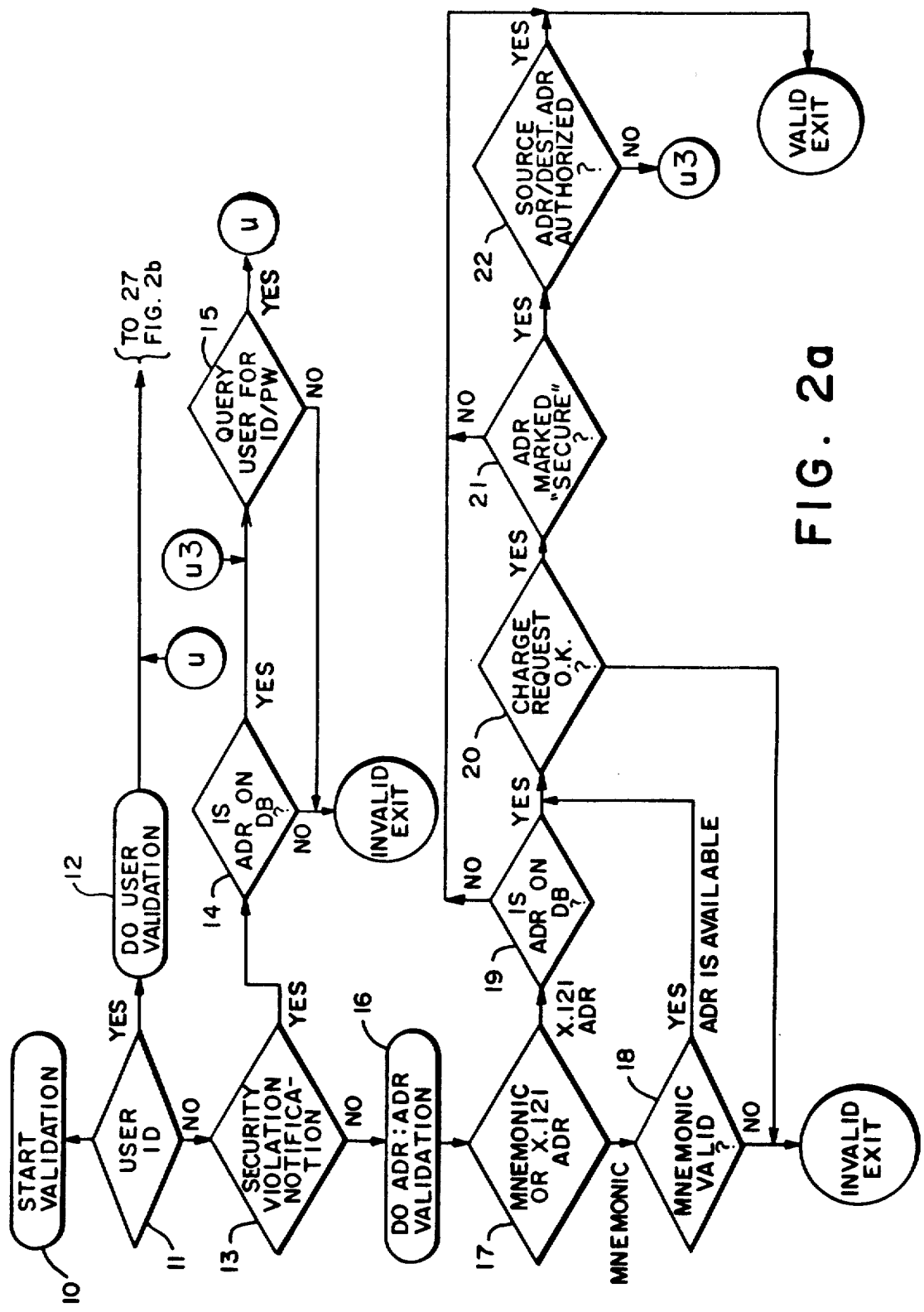
FIGS. 2a, b, c, d, and e are portions of an overall flow chart useful for describing TAMS processing in the system of FIG. 1.

Referring to FIG. 1, a PDN of the packet switching type has associated therewith a DTE 2 operating in conjunction with a PAD 3 for communication with one or more hosts or other data processing devices 4, 5. DTE 2 communicates with network 1 via a packet switch 7, which may, for example, be of the type described in U.S. patent application Ser. No. 07/176,654 to Makris et al. filed Apr. 1, 1988, assigned to the same assignee as the present application. For purposes of the present description, it is sufficient to note that switch 7 serves to prioritize communications between the network 1 and the several DTEs of users in addition to DTE 2 with which switch 7 is associated, and to route the calls and responses between those terminals and the network. In practice, a single switch 7 is capable of accommodating a plurality of terminals. Each of the processing devices 4, 5, is also associated with its own packet switch.

Each PDN customer may establish its own rules and regulations regarding user/subscriber authorization for access to its data or other services or portions thereof. The desire for and provision of access and security measures among the various network customers with respect to their users may vary. Each customer may typically choose to impose its own techniques and measures in these respects, but to do so may and usually does require that the customer implement hardware and software measures at or in conjunction with its host computers, and in some instances to require the implementation of special hardware and software measures at or in conjunction with user terminal equipments. These techniques and measures are not impenetrable to skillful hackers. Moreover, as the imposition of restrictions, and special hardware or software on users becomes more harsh, the ability to successfully employ the PDN as the medium of communication for a wide variety of users become less clear.

To avoid these shortcomings, the network is provided with a telecommunication access management system (TAMS) 8 which may service any of the user- or host-associated packet switches, such as 7. As will be described in detail presently, TAMS 8 includes an administrative host (AH) together with a master relational database pertaining to network customers, including user IDs, passwords, and other relevant information, and a validation host (VH) for running software routines pertaining to scenarios for validating users, that is, the user's authorization to communicate with the addressed host of a particular network customer, or any other destination.

By way of example, if DTE 2 is an async user desiring to access host 5, the user enters its ID, its password, and destination address of the desired host. The address may be mnemonic, or may be a CCITT X.121 numeric address. PAD 3 automatically builds a standard call request packet which includes, among other things, the user's (source) address, and the called (destination) address. The assembled packet is transmitted to switch 7, which reviews the information contained in the packet, and may make an initial assessment as to whether that information dictates a need for user validation. This in turn depends on the requirements which have been imposed by the network customer for the host with which this user desires to communicate. If the switch determines that user validation is necessary, or if the call request is simply to be transmitted to TAMS without preliminary processing for authorization by the packet switch, the call request is forwarded to the TAMS 8. The latter follows a validation procedure by which the information is reviewed and a determination is made, based in part on data stored in the relational database, whether the user will be allowed to access the addressed host or other destination sought to be accessed in the call request.

If that determination is favorable, i.e., the requested access is granted, TAMS 8 issues a call forward on clear (CFOC) message packet which, in essence, informs the switch 7 that this user is valid and the requested connection is to be made. The TAMS relational database correlates all authorized users, their attributes, passwords, and so forth, to addresses to which they are permitted access, among other things. The packet switch 7 responds by transmitting packets including the appropriate call request information and message data via the PDN to the addressed host or other request destination, which accepts the call. The desired communication session may then commence.

The validation procedure may be arranged to be transparent to the user, in that after the desired entry is made (which could, for example, consist merely of placing an access authorization encoded card into an appropriate slot at the terminal), a response is received after processing, which may confirm that the communication session will proceed, or whatever else the nature of the transaction may call for. If, however, the requested access is denied, because the TAMS 8 has determined there is no validation, the user's DTE may be implemented to provide a visual or audible notice of the denial. Alternatively, the user may be effectively informed of the denial by an immediate disconnect. In a presently preferred embodiment of the invention, invalid attempts at a connect from a particular user terminal are logged by the TAMS, and after a preselected number of invalid attempts, TAMS issues a "temporary disconnect" command to switch 7, denying the user any penetration of the network.

In the face of a temporary disconnect, the user may repeat the procedure of establishing a "connect". If desired, once a sequence of a preselected number of successive temporary disconnects has occurred, TAMS may be implemented to issue a "permanent disconnect", in which event a reconnection of the specific terminal may be made only by compliance of the user with whatever rigorous measures may be imposed by the network customer.

By way of further example, an async user may be authorized by the network customer to do a straight connect to the addressed host. In this instance the information contained in the call request packet received by the switch 7 is recognized by the switch as not requiring validation of the user by TAMS 8. The switch may be implemented to proceed with establishment of the connection between the requesting terminal and the addressed host without any communication with TAMS 8. Nevertheless, in such a situation if the packet were incomplete in any material respect, indicative of a security violation, then notwithstanding the authorization of a straight connect to the addressed host, the switch 7 would route the call request to TAMS 8 for validation. In such an instance, TAMS queries the user for his ID and password, and such other information as may be called for by the applicable program stored in TAMS. If on the basis of the user's responses to these queries TAMS determines user validation, it will transmit a CFOC and the procedure described above in response thereto would be similarly followed.

Still another situation which might be encountered in the network is that in which an X.25 host desires to call over to another host. In that situation, the call request is posed to the TAMS via a corresponding packet switch, to accommodate the X.25 host for communication with the desired destination via PDN 1. Here, however, the validation is not by user ID and password, but rather by pre-authorization of the source address (i.e., the X.25 host) to access the destination address (i.e., to communicate with the addressed host), as stored in the TAMS administrative host data base. Upon validation by TAMS, the communication session is established in the same manner as described above for the asynchronous user. Calls may be placed to points outside the network to a foreign PDN by addressing a gateway to the other PDN, or other link to a non-network destination.

TAMS validation processing for the network of FIG. 1 will be described with reference to FIGS. 2a-e. At the outset, the validation process is commenced at 10 (FIG. 2a) with a user desiring access to a specified destination, by reference to whether a user ID 11 exists in the call request. If there is a user ID, a user validation routine 12 is performed by the TAMS VH. Assume for the moment, however, that the user has no ID, which, depending on the specific user, is normally entered either automatically (by being built into the call request at the user's DTE) at startup for access, or in response to a prompt from the system. Absence of a user ID may occur, for example, because the particular DTE is unsecure in that it is available for use by the general public for entering into transactions with on or more hosts via the PDN, or because the user has failed to respond to a prompt. A check is made to determine whether a security violation has occurred (13), by examination through TAMS of the user's address (source address) and the address sought to be accessed by the user (destination address). If a security violation notification is application, bu the source address is on the VH data base (14), the user is queried (prompted) for his ID and password (15). If the source address is not on the data base, or the user does not provide an appropriate response, an "invalid" exit is performed, as will be explained presently.

If, instead, no security violation notification is appropriate based on source address, an examination of the destination address is made as well (16). The destination address may have been specified as a mnemonic ("user friendly") or an X.121 numeric address (17). If mnemonic, but no such address is available (i.e., the mnemonic is invalid (18)), an invalid exit is performed. On the other hand, if the mnemonic address is available, TAMS treats the call request in the same manner as would be the case if an X.121 address were specified and on the data base (19). Where the called address is not found on the data base, TAMS assumes that "security" is not an issue for that particular address, and performs a "valid" exit (to be explained below) for the call request. Assuming, however, that the called address, either mnemonic or numeric, is available, a charge request check is performed to assess whether this particular destination address is accessible subject to a toll and, if so, whether the source address of the user (contained) in the call request is a valid charge account (20). A "no" answer produces an "invalid" exit, but a "yes" is followed by a memory check of whether the destination address is marked "secure" (21). It should be noted that the X.121 address may be on the VH data base, but nevertheless that particular destination may not be designated as secure, in which event the call request would be given a "valid" exit. If the called address is secure, a final check is made that both source address and destination address are authorized for this user (22), and, if so, a "valid" exit is performed. If not, however, the user is prompted for his ID and password (15).

Returning now to the situation in which the user validation routine (12) ascertains that the user has an ID which was built into the call request by the user's DTE (FIG. 2b), a check is made to determine whether the user is freeze-listed or permanently disconnected for prior violations (27) by comparing the ID against a list compiled in suitable read-only memory. If the answer is "yes", the call request is denied by performing an "invalid" exit (28). A negative answer, however, leads to an assessment of whether the user ID is valid (29). If it is not, an "invalid" exit is performed. If a valid ID is found, the password (which is also built into the call request in a conventional manner) is examined for validity (30). If the password is not valid, the appropriate disconnect status is processed (31) and communicated to the user's DTE, and an "invalid" exit is performed (28). If the password, like the ID, is valid, the TAMS appraises whether a temporary disconnect should be performed (32); for example, because the called address is unable accept a call at that time. In that event, a disconnect is performed through an exit (28), but the user's ID is appropriately notified and the call request may be automatically reinitiated to commence processing after bypassing the temporary disconnect as a negative response.

Following the temporary disconnect assessment, with a "no" answer, the destination address contained in the call request is examined for characterization as mnemonic or X.121 numeric (33). A mnemonic address is examined for validity (34), and if valid (e.g., no such address is available in the network), an "invalid" exit is performed.

However, if the mnemonic address is valid (FIG. 2c), a check is performed to determine whether a password change is required for access to this particular destination address (35). No change requested, indicative of the called address being available, results in processing of the call request by TAMS in the same manner as if the call request had contained an X.121 address which is found in the data base (36), as will be discussed below. If a password change is requested by the called address, the related memory for TAMS is examined (or, in the alternative, the user's DTE is queried) as to whether the user is allowed to change its password (38). If such change is not permitted for this particular user, an "invalid" exit is performed (39). Where the change of password is allowed, the user is queried for the new password (40), and, if the password is correct, the call request is processed through a "valid" exit from TAMS (41). If, however, the new password provided by the user is invalid, an "invalid" exit is performed (39).

Returning to the situation where the called address in the call request is X.121 numeric rather than mnemonic (33), the X.121 address is examined (FIG. 2d) to determine whether it is on the TAMS data base (43) by comparison with the appropriate list in related read only memory. As in the example previously discussed herein, if the called address is not found on the data base, TAMS assumes that "security" is not a consideration for access to the particular called address. In that case, the user charge request is examined for validity (44), and if it is, a "valid" exit (45) is performed on the call request. On the other hand, an invalid change request will result in an "invalid" exit of the call request from TAMS (46).

If the X.121 address designated for the destination in the call request is found on the data base (43), a charge request check is performed to assess whether the called address is subject to a toll charge and, if so, whether the source address of the user or hose in the call request is cleared to bear such a charge (48). This is the same point of the processing for a mnemonic address in the call request where no password change is requested and the called address is available (36). A "no" answer to the "charge OK?" inquiry will result in a further query as to whether the TAMS itself is permitted to override the non-acceptable charge response (49) (for example, where the user account is past due but other factors dictate an OK). If TAMS may not override, an "invalid" exit is performed (46), but a "yes" answer is followed by a setting of the correct charge (50), and further processing in the same manner as for an affirmative answer to the original "charge OK?" inquiry (52).

Referring to FIG. 2e, the processing by TAMS then determines whether the destination address is marked "secure" (53). If it is secure, the user address is checked to assess the user's authority to access that destination (54), and, if the user is not authorized, the call request is given an "invalid" exit (55). Where either the called address is not marked "secure" or the user address is found to be authorized for access to the "secure" destination address, TAMS queries whether the called address is reselected (56). A "no" answer results in setting up a return to the originally requested address (57), whereas a "yes" answer is followed by setting up a return to the reselected address (58). In either event, the call request receives a "valid" exit (59).

A "valid" exit in any of the above-described instances is the issuance by TAMS of a call forward command with "valid" indication and pertinent information including a security key if the destination address is marked "secure". On the other hand, an "invalid" exit is characterized by a call forward from TAMS with an "invalid" indication and an appropriate error message.

Figure 3:
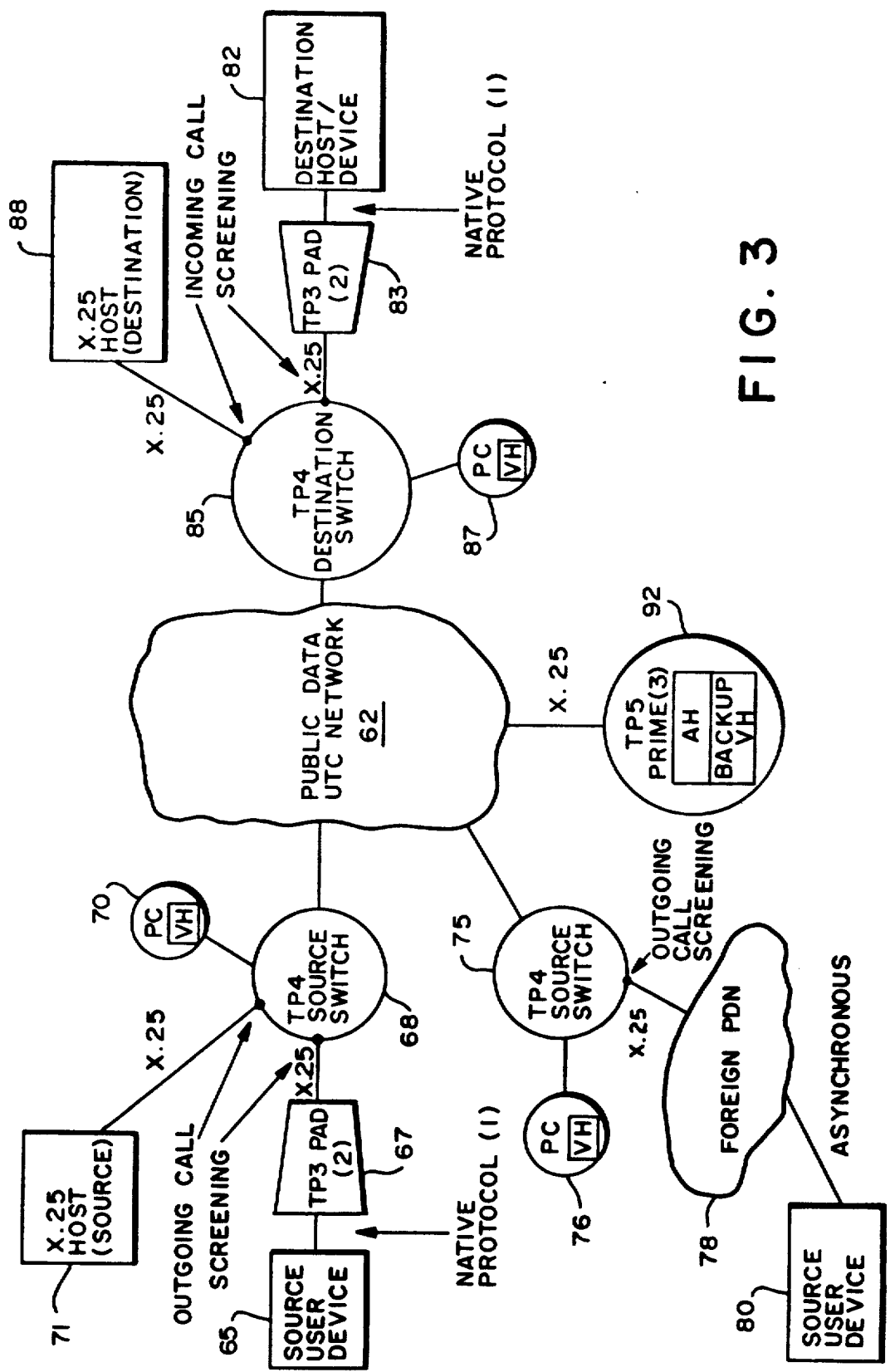
FIG. 3 illustrates a PDN with associated users and hosts and foreign PDN, as well as associated devices, in greater detail for use in describing the presently preferred embodiment of the invention.

FIG. 3 illustrates a PDN with associated users and hosts and foreign PDN, as well as associated devices, in greater detail for use in describing the presently preferred embodiment of the invention. At the source, a user device (DTE) 65, PAD 67 receiving native protocol from the user DTE and supplying X.25, and source packet switch 68, are located at a point of entry to PDN network 62. The switch 68 has an associated PC 70 with VH software. An X.25 host 71 communicates with the switch 68. Outgoing call screening is performed at the entries to the switch for X.25 from PAD 67 and host 71. Another source switch 75 with an associated PC 76 on which a VH for TAMS is located, is disposed in data communicating relationship with a foreign PDN 78. An asynchronous user 80 has access to the foreign PDN.

At a destination for calls to and from the PDN 62, a destination (host) device 82 is associated with PAD 83 and destination switch 85. The switch is arranged to communicate with an associated PC 87 having on-board TAMS VH. An X.25 host (destination) 88 communicates with switch 85. Incoming call screening is performed at the entries to the switch for X.25 from PAD 83 and host 88. At another location relative to the network 62, a minicomputer (e.g., Prime computer) 92 accommodates the TAMS AH and a backup VH.

The TAMS system described earlier may be implemented to provide four major functions to the asynchronous user, namely, user ID validation, address pair validation, address (mnemonic) validation, and password change. User ID validation compares the user-entered ID and password (and optional logical data) against the user's record in the TAMS data base. If the user ID and password are valid, a further check may be made to verify that the user may access the requested destination. The validation information may be present in call request facilities (single-transaction validation, in which validation of a call request is based solely on the contents of the call request packet, which is responded to by the VS with a clear request rather than entering data transfer state), or may be obtained interactively. The validation host (VH), which has the primary function of running the validation subsystem (VS) that validates call requests, only interacts with asynchronous users. The interactive mechanism exists primarily to validate users entering a network across an X.25 of X.75 gateway; the calling device in this case might not support the facilities required for single-transaction validation.

Address pair validation compares the calling address against a list of valid addresses that may place calls to the destination DTE. This mechanism is used for callers which do not directly interact with the PAD at call setup (e.g., autoconnect devices, HPAD, X780, and X.25 hosts). These calls therefore have no user ID associated with them. Outgoing call screening, a facility which indicates that all calls from a particular DTE must be validated by the TAMS system, must be used on the source DTE lines, to force the calls to be routed to the TAMS VH for validation.

In the single-transaction validation scenario, TAMS provides a mnemonic addressing capability; the user may enter a mnemonic rather than a numeric destination. Calls with mnemonics are forwarded to a VH which translates the mnemonic to an X.121 address, performs any required call validation, and forwards the call to the desired destination. Multiple X.121 addresses may be assigned to a particular mnemonic; TMAS will distribute the calls across all the addresses. This capability is also referred to as load-sharing. Asynchronous users are allowed to change their passwords by entering a special mnemonic representing the password change application.

In one technique, TAMS accepts the call and prompts the user for his user ID, old password, new password, and new password again. If the password is changed successfully, the call is cleared with a VER facility (validation error facility used to indicate to the caller the reason a call was not forwarded to the destination) containing an appropriate message. If the password change is not successful, the VER facility will contain an appropriate error message. In another technique, the password is generated by TAMS and displayed to the user, after which the call is cleared with an appropriate message in the VER facility.

Figure 4:
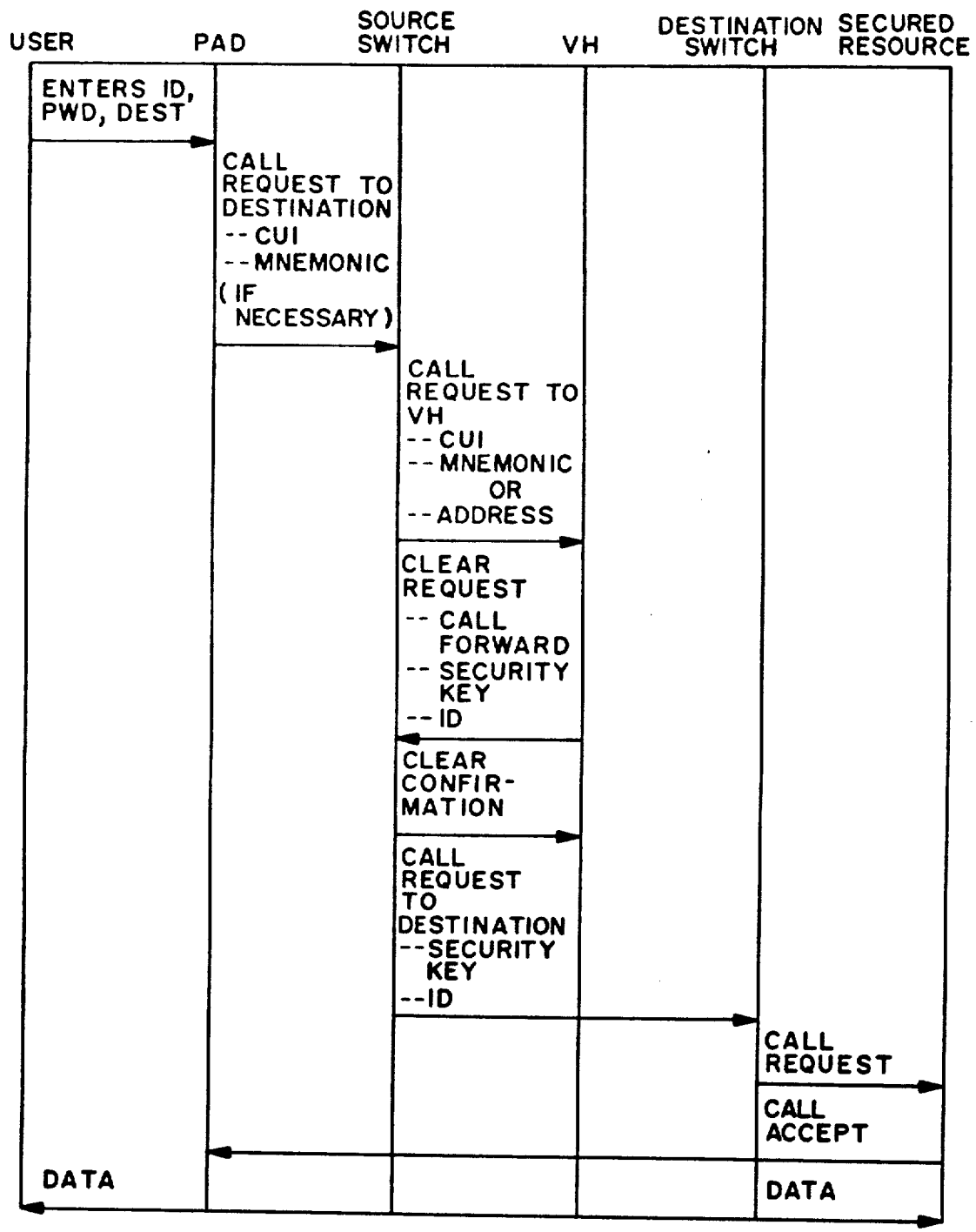
FIGS. 4-6 are sequence diagrams illustrating the message flows for certain types of validation, including user ID validation, address pair validation, and interactive user ID validation.
Figure 5:
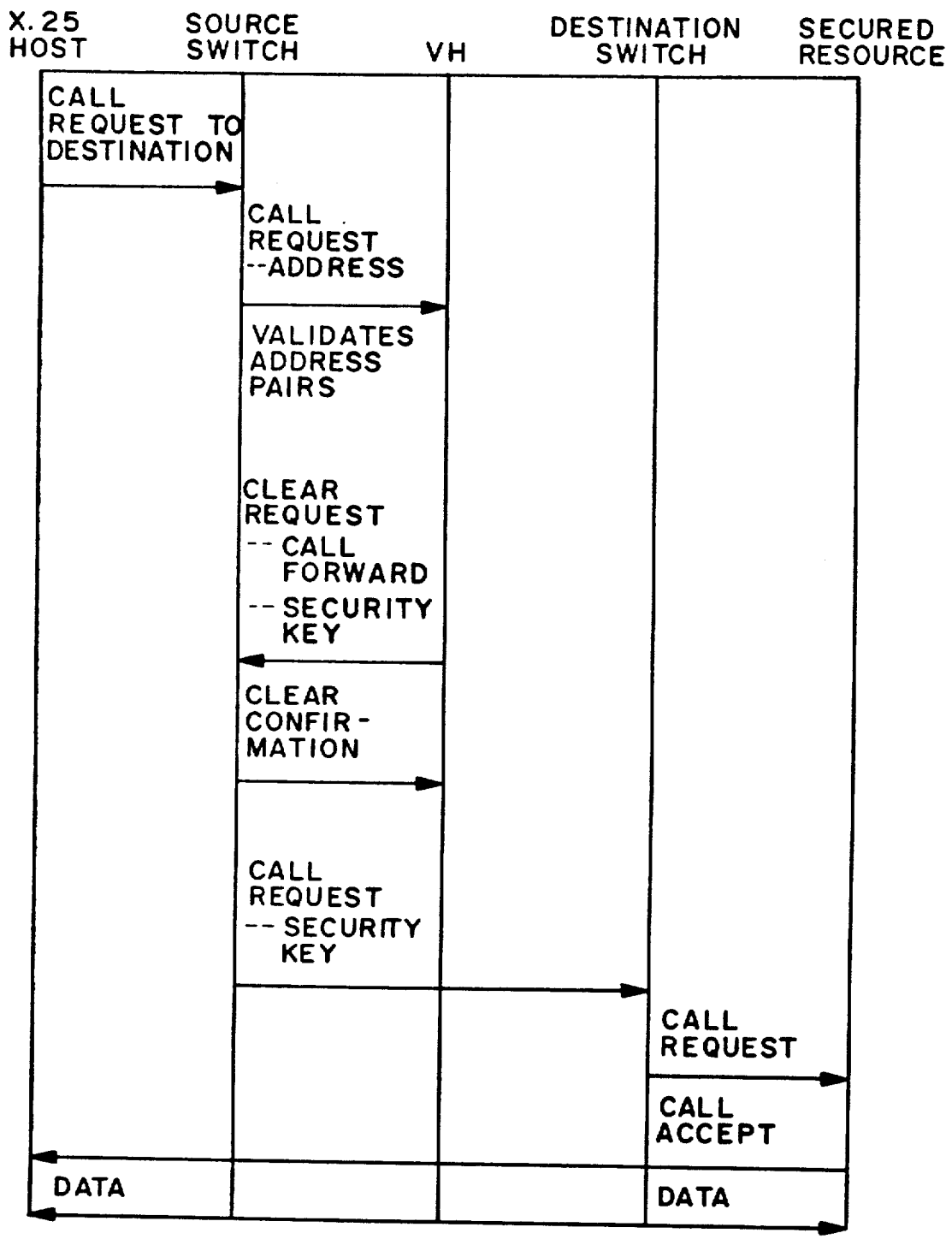
Figure 6:
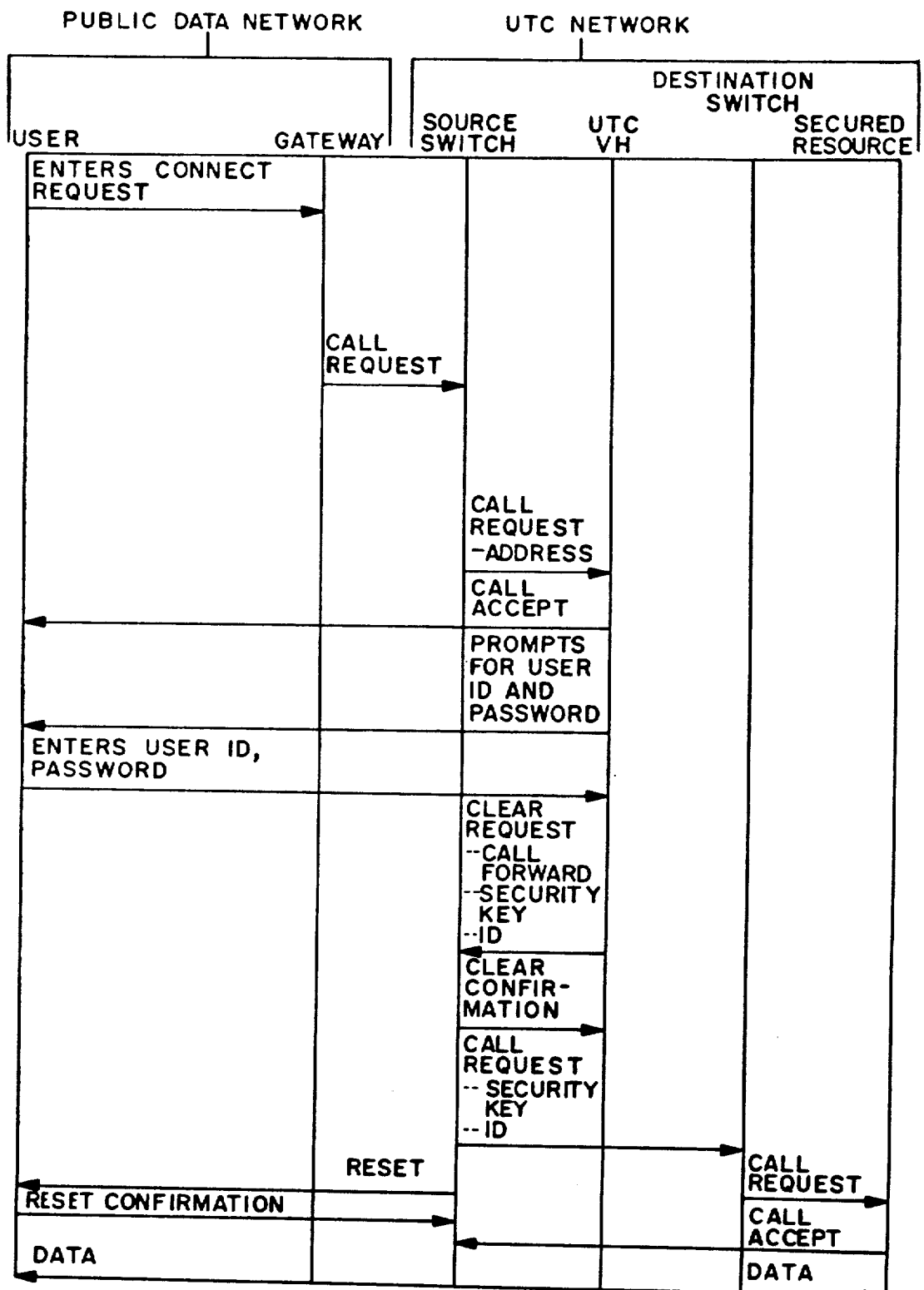

The sequence diagrams of FIGS. 4–6 illustrate the message flows for three types of validation: user ID validation (single-transaction), source address (address pair) validation, and interactive user ID validation (validation of a call request by interactive dialogue between the VS and the user, available for asynchronous DTEs only). Referring to FIG. 4, in single-transaction validation all information needed to validate a call is supplied to the VH in the call request. The user ID, password, and destination are entered by the user, and placed in the call request by the PAD. For certain types of PADs (NR 3.31), the information is entered in the form of a single-line sign-on connect request, as follows:

@<destination>,<user ID>, <password>

Throughout, the notation:—<facility>—defines a facility in the call request and clear request packets. For other types of PADs (NR 3.52), the information is entered by the user in response to prompts by the PAD, thusly:

USER ID? MITH/
PASSWORD? (no echo when full duplex terminal entry)
DESTINATION? STA/

The PAD packages the user ID and password into a CUI facility→PAD 3.31 (a calling user identification facility constituting a TAMS version of the network user identification (NUI) facility containing the user ID and password entered by the user at the PAD), or NUI→PAD 3.52, and places it in the call request. If a mnemonic was entered as the destination, a mnemonic facility is built in the call request, and a zero-length called address is used. If a numeric address is entered, it is used as the called address in the call request. The call request is then sent to the source switch, which recognizes the presence of TAMS facilities including CUI or NUI (and the mnemonic facility MN if a mnemonic destination is conveyed to the VS). In response, the source switch forwards the call to a VH by substituting the VH address as the called address in the call request. If a called address was present in the original call request, it is placed in an address facility in the call request to the VH.

On the VH, the VS validates the user ID and password, translates the mnemonic, if any, to a numeric (X.121) address, and validates that the user may access the desired destination. If access is not allowed, a clear request is built with a VER facility indicating the error to the user. In that instance, the VER is received by the source switch in the clear request, from which it is passed on to the PAD, and the call is cleared down.

On the other hand, if access is allowed, a clear request is built with several other facilities. These include a CFW facility (a call forward which instructs the source switch to redirect the call to a specified destination address), an ID facility (used to communicate a version of the user ID as billing information to the network or for other accounting purposes), and a SKY facility (which contains the security key needed to pass the screening at the destination switch). The CFW facility is received by the source switch, which sends a new call request to the specified destination, containing the ID and SKY facilities passed in the clear request. At the destination switch, the presence of the SKY facility allows the call to be passed through to the destination DTE. The latter is then permitted to accept the call and enter the data transfer state for a communication session with the user.

Address pair validation, illustrated in FIG. 5, does not requires any special processing on the part of the source DTE, such as the PAD. In this scenario, an ordinary call request is sent to the source switch by the source DTE. If outgoing call screening is turned on for the source DTE in the switch tables, the call is forwarded to a VH for validation. Since, by definition, the caller/device in a source address (address pair) situation is not associated with a specific user ID (for example, an HPAD, X780, or autoconnect call), the call request will contain only an address facility including the originally called address. On the VH, the VS validates the source address against those which are allowed to call the specified destination. If access is denied, the call is cleared; the clear request would contain the VER facility only if the protocol ID is asynchronous. If access is allowed, the call is forwarded to the called destination in the same manner as described above for single-transaction (user ID) validation. For an invalid call (access denied), the clear request will contain a clearing cause and a diagnostic code which are returned to the source DTE. In contrast, the cause and diagnostic in the clear request for a valid call are not seen by the source DTE because the call is forwarded. As in the single-transaction scenario, when the destination DTE is permitted to accept the call, it may then commence a communication session with the source DTE in which data are exchanged.

Referring now to FIG. 6, interactive validation provides user ID validation to asynchronous terminals in those situations where the NUI or CUI facility cannot be supplied because of the nature of the call; for example, from a non-conforming PAD, or across a gateway. In this scenario, outgoing call screening on the source DTE (or gateway) line forces the call (which contains the destination X.121 address in the address facility) to be routed to a VH for validation. On recognizing that no user ID is present, the VH accepts the call and prompts the user for his user ID and password. Validation proceeds as described above for the single-transaction situation. If the call is not valid, a clear request with VER facility is sent, and the source switch is typically configured to not pass this on to the source DTE. If the call is valid, a clear request containing CFW, ID, and SKY facilities is sent, to forward the call to the specified destination. Because the source DTE is already in the data transfer state, the source switch resets the virtual circuit back to the source DTE to realign the packet-level sequence numbers for the forwarded call. In this case, when the destination DTE accepts the call, no call connected facility is sent to the source DTE, since the latter is in the data transfer state.

Calls across a foreign gateway must be either asynchronous or X.25, which is determined by the call request protocol ID or lack thereof. If the protocol ID is X'01', the caller is assumed to support the standard CCITT X.3 parameter set and X.29 protocol, and the IA5 ASCII character set. In that case, interactive validation is used. If there is no protocol ID or user data, the caller is assumed to be an X.25 host, and address pair screening is used. In all other cases of calls across foreign gateways, the call is rejected.

The enhanced TAMS is utilized in a packet switching network to protect network resources from unauthorized access. The system screens call requests before sending them to their destination, and bars unauthorized calls, by employing methods of user ID validation for end users and calling/called address pair validation for non-interactive devices. Users are required to change their passwords at periodic intervals, selectable by the system administrator, when notice is given by TAMS to the user that the password has expired. Terminal PADs utilized for making connections must obtain user ID, password, and destination address as part of the connection sequence. The validation subsystem (VS) will support only user-generated password changes, invoked by connecting to a special password change mnemonic which is recognized by the VS. The AH is notified in real-time of invalid access attempts as an alarm log. The TAMS host software is partitioned onto an AH, multiple VHs on respective PCs associated with the respective source and destination switches, and a single backup VH, with data base updates automatically, transferred between AH and VH data bases, but not necessarily in real-time.

In the preferred embodiment of the enhanced TAMS system shown in FIG. 3, the ITI-2 and Async-to-3270 DSP-2 terminals PADs obtain user ID, password, and destination as part of the connection sequence. The former PAD prompts for these fields, while the latter PAD employs off-line menu processing. This information is used to build NUI and MN facilities in the call request. The "system password" (account code) is not used, and the PADs do not prompt for it, or display a field in the case of the Async-to-3270 PAD. The SNA 3270 and BSC 3270 DSP-2 terminal PADs are enhanced to build NUI and MN facilities based on information entred in the off-line (CONNECT) menu, rather than processing the ID and MN locally. Since the system password is not used, these PADs do not contain a field for it. The VS supports only user-generated password changes. Such changes are invoked by "connecting" to a special Password Change mnemonic, which is recognized by the VS. The user may indicate the desired new password at the PAD password prompt. Notification of invalid access attempts are sent in real-time to the AH, and additional reporting capabilities are required for this "alarm log".

The TAMS host software is partitioned onto an AH, multiple PC VHs, and a single centralized administration and backup VH (e.g., the Prime minicomputer 92 which provides both Administrative Subsystem (AS) and Validation Subsystem (VS) capabilities). Data base updates are automatically transferred between AH and VH data bases, rather than requiring operator intervention to transfer transaction files between the hosts and to apply the transaction files to the data bases, as in the existing system. However, the update system is not required to operate in real-time. The user will be required to change its password at periodic intervals, the frequency of which is a configurable, system-wide parameter, selectable by the system administrator. The system notifies the user that the password has expired, and the user must then execute a change.

The ITI-2 PAD, 3270 BSC DSP-2 PAD, 3270 SNA DSP-2 PAD, and Async-to -3270 DSP-2 PAD each supports the user interface. The user enters ID, password and destination using the off-line menu and this information is used to build the NUI and MN facilities required for validation by the VH or VS. The VS interfaces to the PDN to validate calls forwarded by a packet switch to a VH. The AS provides the ability to build and update the system data base used by the VS. The system data base is implemented using the RAPPORT data base management system (DBMS), and consists of a number of interrelated files.

The VS software consists of three major programs, namely, Validation Phantom, Operations Manager, and Intruder Alarm. The Validation Phantom receives validation requests from the network and validates them against the system data base. For example, for a single-transaction validation where the user has entered a mnemonic, the user record is retrieved and the password validated. Then the mnemonic is translated to a network address, and the corresponding network address record is retrieved. If the address is secured, access by that user is validated by looking for a User/Mnemonic record matching that user with the mnemonic. Finally, the allowable call types of both user and host are validated against those received in the call request (CUI or NUI facility). When the call has been validated, the Validation Phantom clears the call with the CFW, ID, and SKY facilities, to forward the call to the proper destination. Invalid attempts by a known user are subject to a retry algorithm, which permits a configurable number of invalid attempts within a specified time interval, after which a user is temporarily suspended for a predetermined period of time. During that period, all attempts by the user to access the network are rejected. If the user is temporarily disconnected a configurable number of times without successful validation, the user is permanently disconnected, requiring administrator intervention to enable subsequent access to the network. In the present embodiment, each Validation Phantom can process only one call at a time; multiple phantoms are run to support a multiplicity of simultaneous validations. However, a single Validation Phantom could be implemented to perform the latter function, if desired.

The Operations Manager is utilized to control and monitor the VS. It allows the system operator to initiate and terminate the validation phantom, and the intruder alarm phantom to be described below. Various monitor displays are used to indicate the current status of the VS. In the present embodiment, the program is used to instruct the phantoms to switch the copy of the data base they are using for the validations.

The Intruder Alarm phantom receives notifications of certain serious invalid access attempts, for example, by freeze-listed or suspended users, and routes these alarms to a terminal and also writes them to the log file on the data base. RAPIDE query language may be used to produce ad hoc reports on this file, if desired.

In addition to the foregoing programs, a password change may be included as a VS process to interact with the asynchronous user to obtain a new password. Further, provision may be made for automatically generated passwords rather than allowing the user to compose its own password.

The AS software includes DB_MAINT, which is the primary program used to administer the access amnagement system data base. This program is used to interactively query/modify the contents of a data base (AH or VH). Interactive updates are written to a transaction log; another DB_MAINT function allows this log to be applied to a data base in "batch" mode. In the single AH/multiple VH environment, the transaction log is manually transported from the AH to each VH on a period basis (e.g., daily), and applied to the VH data base(s). The manual transportation is typically accomplished via tape, or host (e.g., Prime mincomputer) file transfer. The batch update mechanism is also used in the PDN environment to apply transactions generated by management information systems (MIS) that have the responsibility of adding new users, hosts, and the like to their own systems.

DB_MAINT also produces a variety of reports, either on-line or to a disk file. A "read-only" version of DB_MAINT known as DB_QUERY provides only record query and report capabilities. RAPIDE query language is a fourth-generation language supplied by RAPPORT for ad hoc reporting and other activities against the data base, and, as with DB_MAINT, may be used against any of the access management system AH or VH data bases. In addition, utilities are provided to print/purge the Log File, freezelist a user, drain password changes to transaction log for application to the user record, and create/dump/load the data base.

Figure 7:
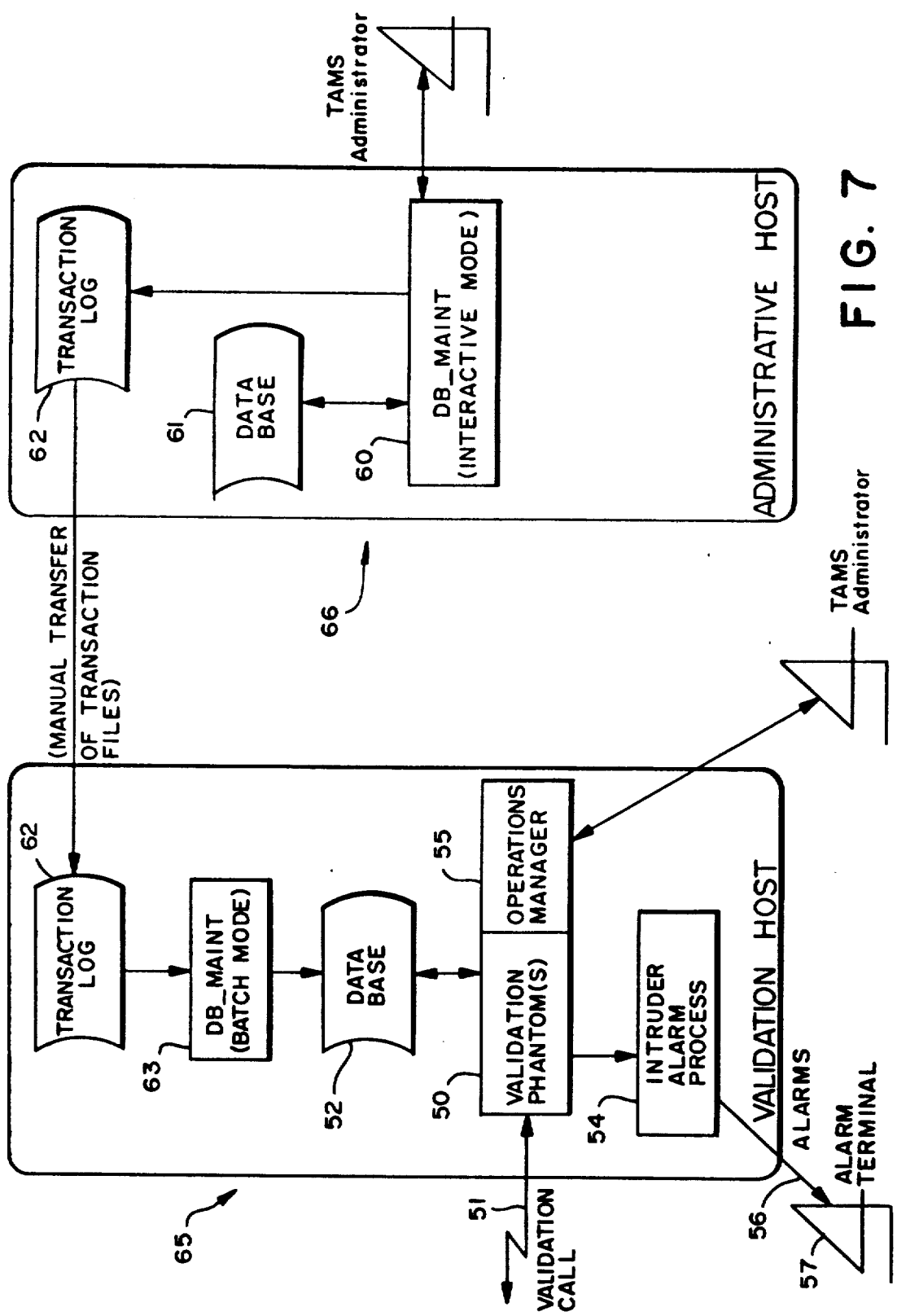
FIGS. 7 through 12 inclusive are block diagrams of the various key components and operative relationships provided for the TAMS system in the embodiment of FIG. 3.

An example of the TAMS data flow is shown in FIG. 7 Validation Phantom 50 of a VH 65 (on a particular PC) receives a validation call 51 from the network and accesses the system data base 52 for validation. If the call is validated, Validation Phantom 50 clears the call by means of building a clear request with CFW, ID, and SKY facilities, thereby forwarding the call to the proper destination. If the call is invalid (subject to the predetermined number of retries, if appropriate, and the predetermined number of invalid attempts within the selected time interval), the Intruder Alarm phantom 54 is notified, under the control of Operations Manager 55. Depending upon the seriousness of the access infractions, the Intruder Alarm phantom may route the applicable alarms 56 to an alarm terminal 57, as well as to write them to a log file on data base 52. As indicated earlier, operations Manager 55 controls and monitors the VS and permits the system operator to initiate and terminate the validation and intruder alarm phantoms. At the AH 66 (on a minicomputer), the DB_MAINT program 60 interactively queries and modifies the contents of data base 61 of AH 66 or data base 52 of VH 65. The interactive updates are written to transaction log 62, the contents of which are applied through the batch mode function 63 of DB_MAINT to data base 52 of VH 65. As noted above, in the embodiment in which a single AH is utilized with a multiplicity of VHs (one associated with each PC), the files of transaction log 62 are manually transferred periodically from AH 66 to the data base of each VH (including 65). The TAMS Administrator interacts with both the DB_MAINT program and the Operations Manager to perform their respective tasks.

Figure 8:
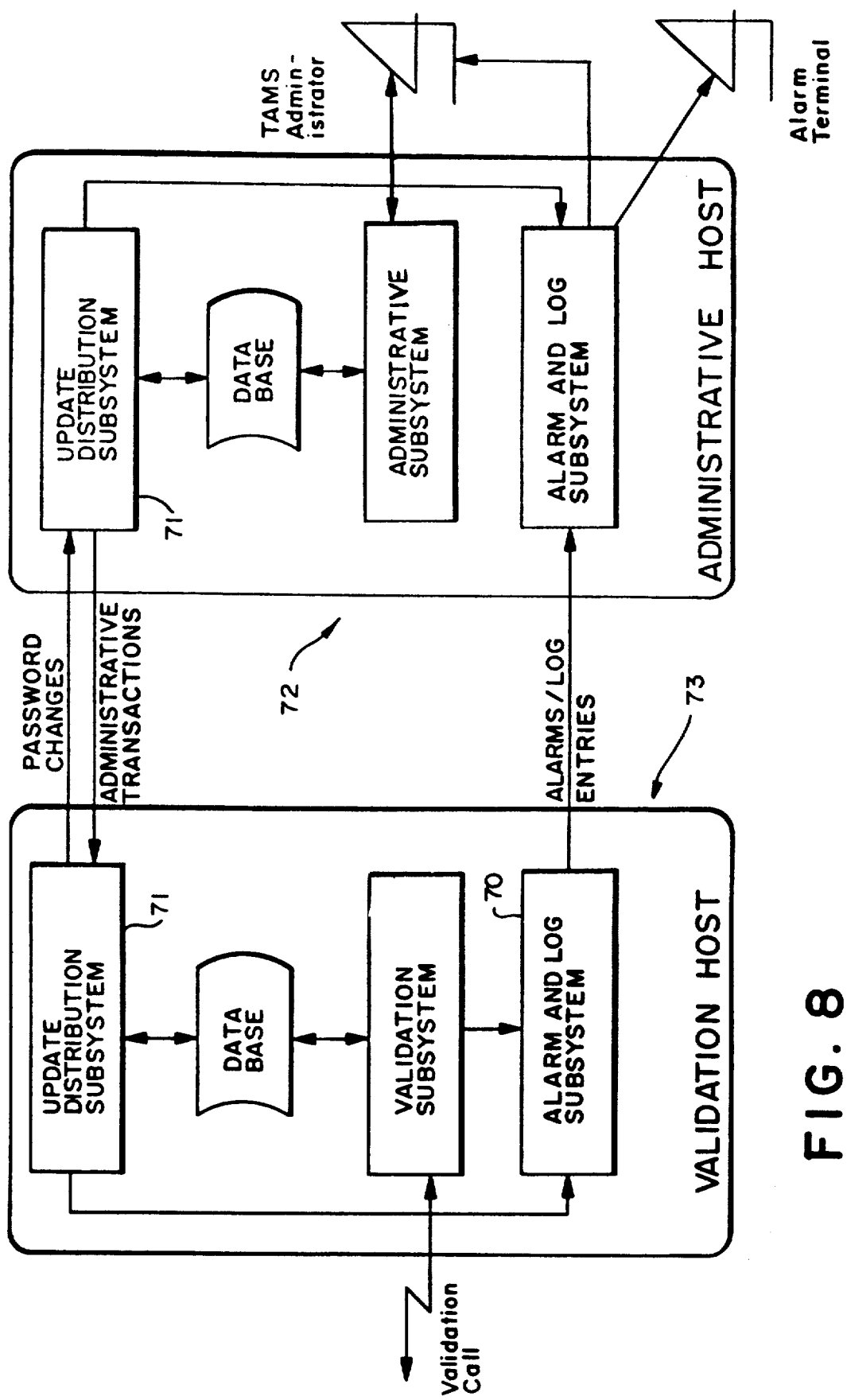

The TAMS data flow in a preferred embodiment of the present invention is illustrated in FIG. 8. An Alarm and Log subsystem 70 replace the Intruder Alarm phantom of the VS of FIG. 7, to provide centralized collection, display, and analysis of alarms and log records. An Update Distribution subsystem 71 provides automated collection and distribution of data base updates to and from AH 72 and VH 73, in place of the manual method performed in the system of FIG. 7.

Figure 9:
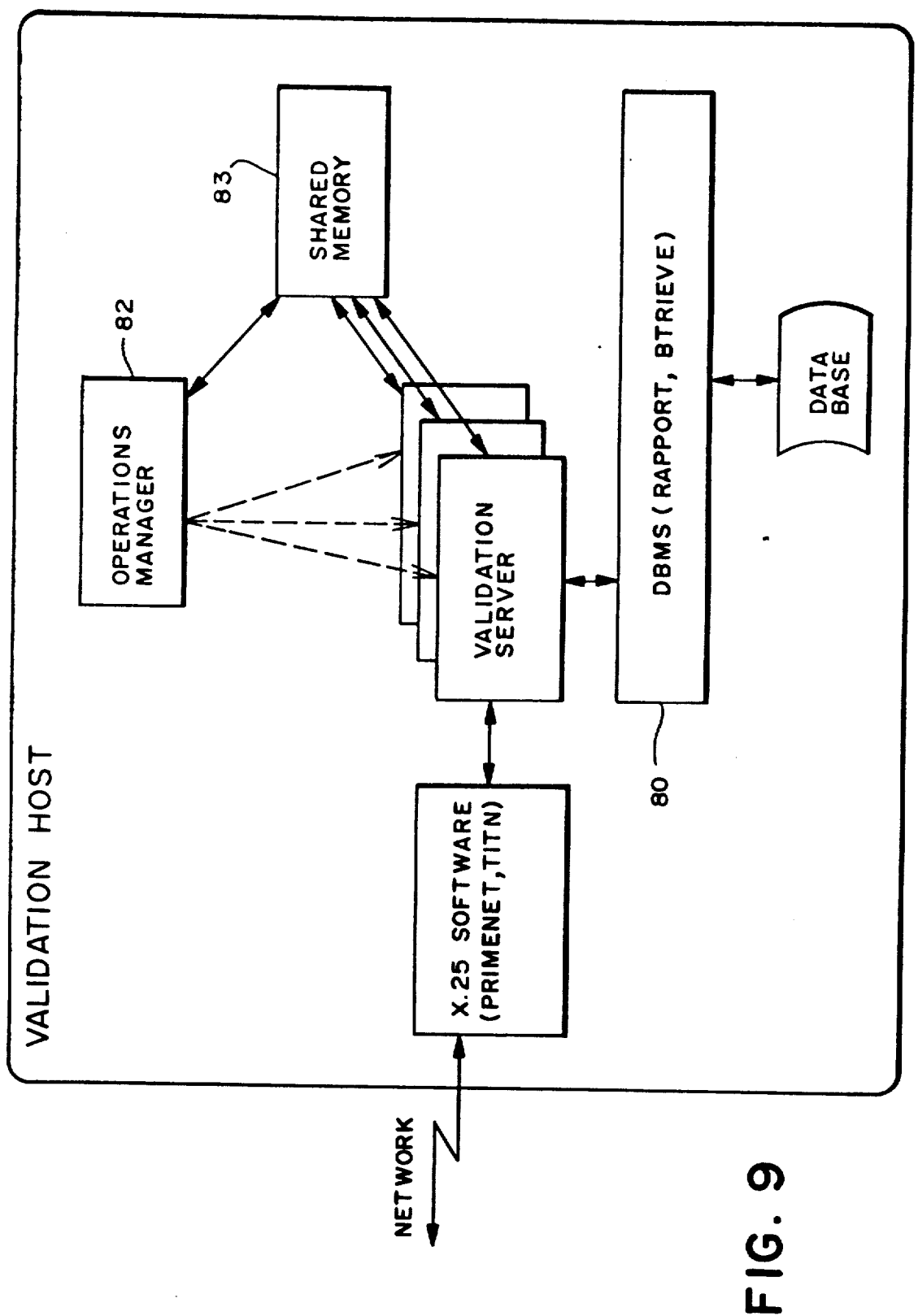

An exemplary Validation Subsystem is shown in FIG. 9. In the PC based VH of the present invention, the Validation Host (VH) software may run under XENIN on a Tandem 6AT computer with AST X.25 board. The TAMS data base is managed by a BTRIEVE file management package 80, which provides most of the features of the RAPPORT DBMS.

The NUI (Network User Identification) facility is supported for single-transaction validation. The NUI facility is placed in the call request packet by the PAD when the user enters its user ID and password. Password changes are processed locally by the receiving VH, and forwarded to the AH for distribution to the remaining VHs. In the VS, password change requests are sent to the VH as an NUI facility, with the Password Change application mnemonic as the destination. Both the old and the new password are contained in the NUI facility for a password change. If the old password matches the current user password in the the TAMS data base, the password is changed to the new password. In that case, the call is cleared with a VER facility indicating the successful password change. The user must then reenter the user ID, new password, and destination, and be revalidated. If the change was unsuccessful, because the old password is invalid, an appropriate message is sent to the user in the VER facility as the call is cleared. Users from foreign PDNs are accommodated in substantially the same manner, but through support in the interactive validation dialogue. An interactive password change is performed regardless of the specified destination address or mnemonic.

The VH is capable of initiating all VS software automatically, including data base server, data base recover program, validation phantoms, update distribution phantom, and alarm mailer phantom. These processes are run from the system startup file (XENIX or equivalent). The ability to remotely log-on to XENIX is provided for emergency use.

For valid calls, the following facilities are sent in the clear request: call forward, indicating destination DTE; security key, if the host is secure: ID, if a user ID was entered; and charge override, if a user ID was entered and no change type was specified in the reverse charge facility.

Figure 10:
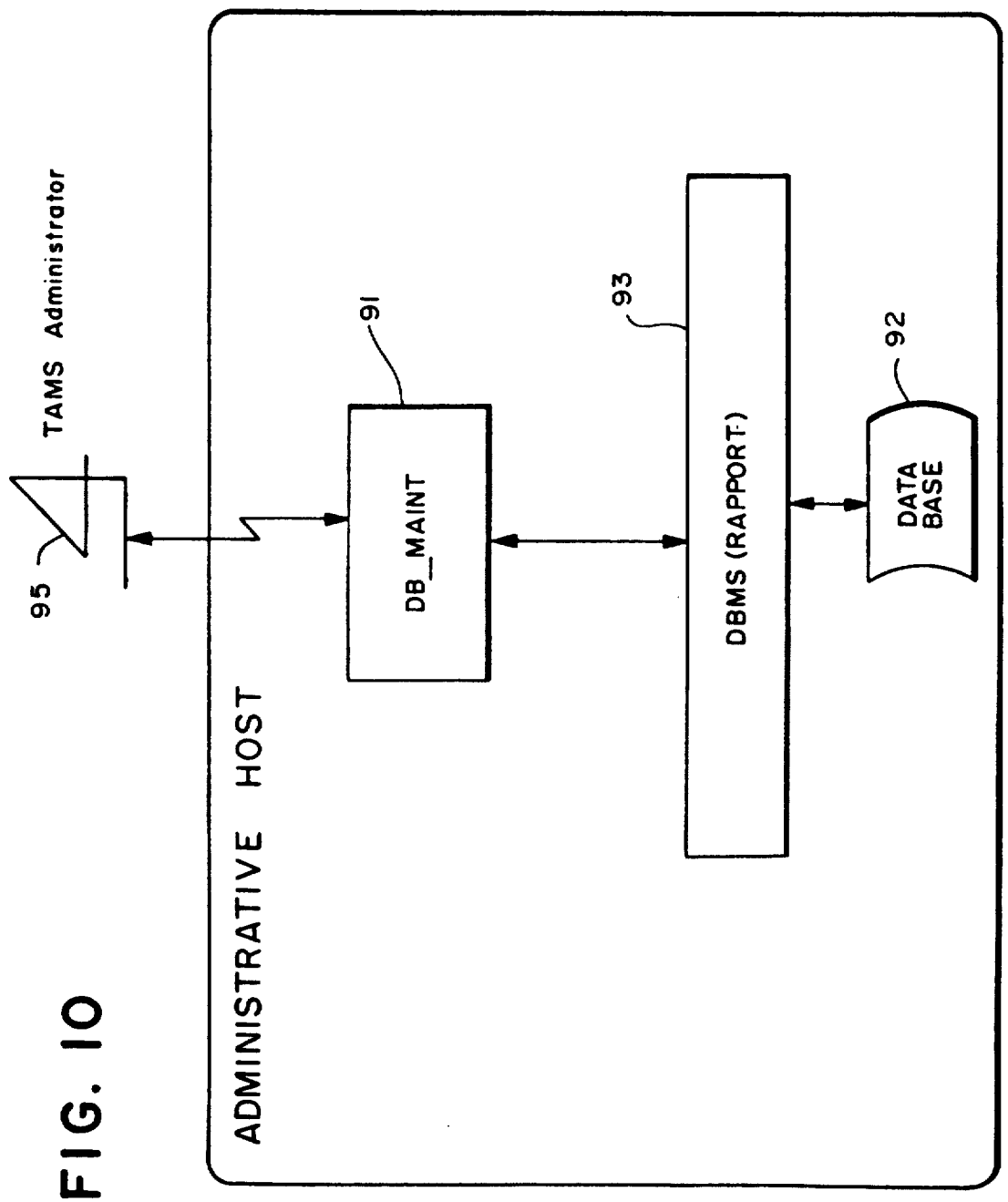

A typical Administrative Subsystem is shown in FIG. 10. In support of the Update Distribution subsystem, DB_MAINT 91 shares its transaction log with all other subsystems running on the AH. Transactions are logged in before they are actually applied to the data base 92. A RAPPORT data base management system 93 is utilized. To accommodate recovery from catastrophic failures, the data base is dumped periodically (e.g., nightly) to a transaction file, and the most recent dump is kept online. Relevant Update Distribution subsystem data structures are also updated during the dump to indicate the current dump for use in VH recovery. This functionality is mutually initiated by the TAMS Administrator 95.

Figure 11:
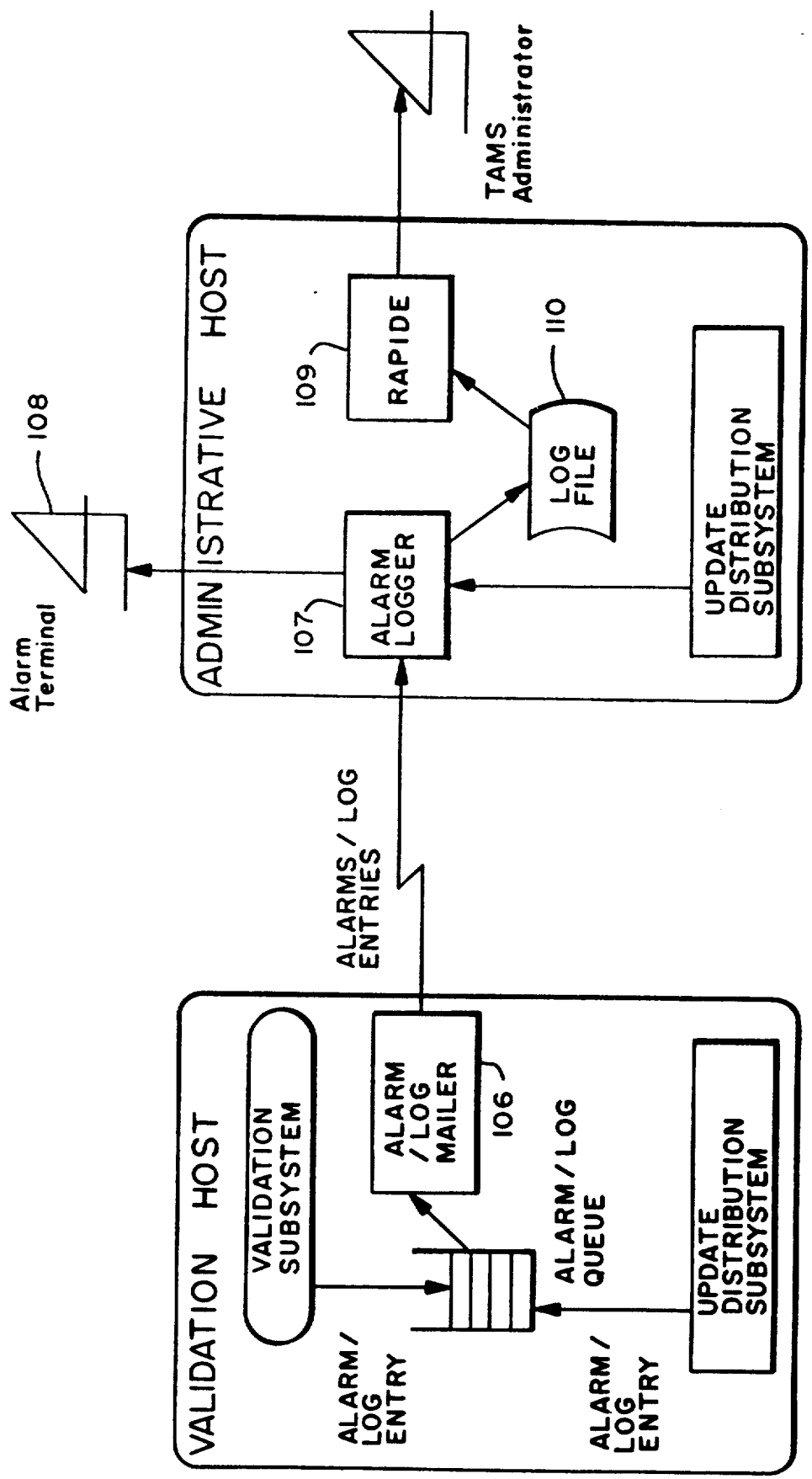

The Alarm and Log Subsystem is shown in FIG. 11, and consists of three primary components: an alarm/log mailer 106 which routes alarms and log records from the VH to the AH; an alarm logger 107 which logs the received records and displays alarms on the alarm terminal 108; and RAPIDE 109 which produces various reports from the log file 110. All system alarms and log records are sent to the AH as a central site for logging, display, and reporting. Alarms and other log entries continue to be generated by the Validation Phantoms. An alarm is generated when a user has registered a configurable (preprogrammed) number of successive invalid log-in attempts within a preselected time interval, or when a user is permanently suspended, for example. The Alarm and Log Subsystem provides a subroutine interface through which any subsystem may send an alarm to the Alarm Mailer. To minimize the number of active virtual circuits on the AH, the Alarm Mailer clears down the call to the AH after a predetermined period of inactivity.

Unformatted alarms and log entries are received at the AH, written into the Log File, and may be sent to the Alarm Terminal. The Log File on the data base contains the date/time of the entry, log code and message type, and a text area containing destination/source addresses, user ID, and/or call types appropriate to the type of error. These additional fields are formalized by defining them as individual fields to RAPPORT, which allows ad hoc reports to be created based on the fields, using RAPIDE query language. The sending VH is also identified in the log record. The format and content of reports created by RAPIDE from the LOG File is determined by the TAMS Administrator.

Figure 12:
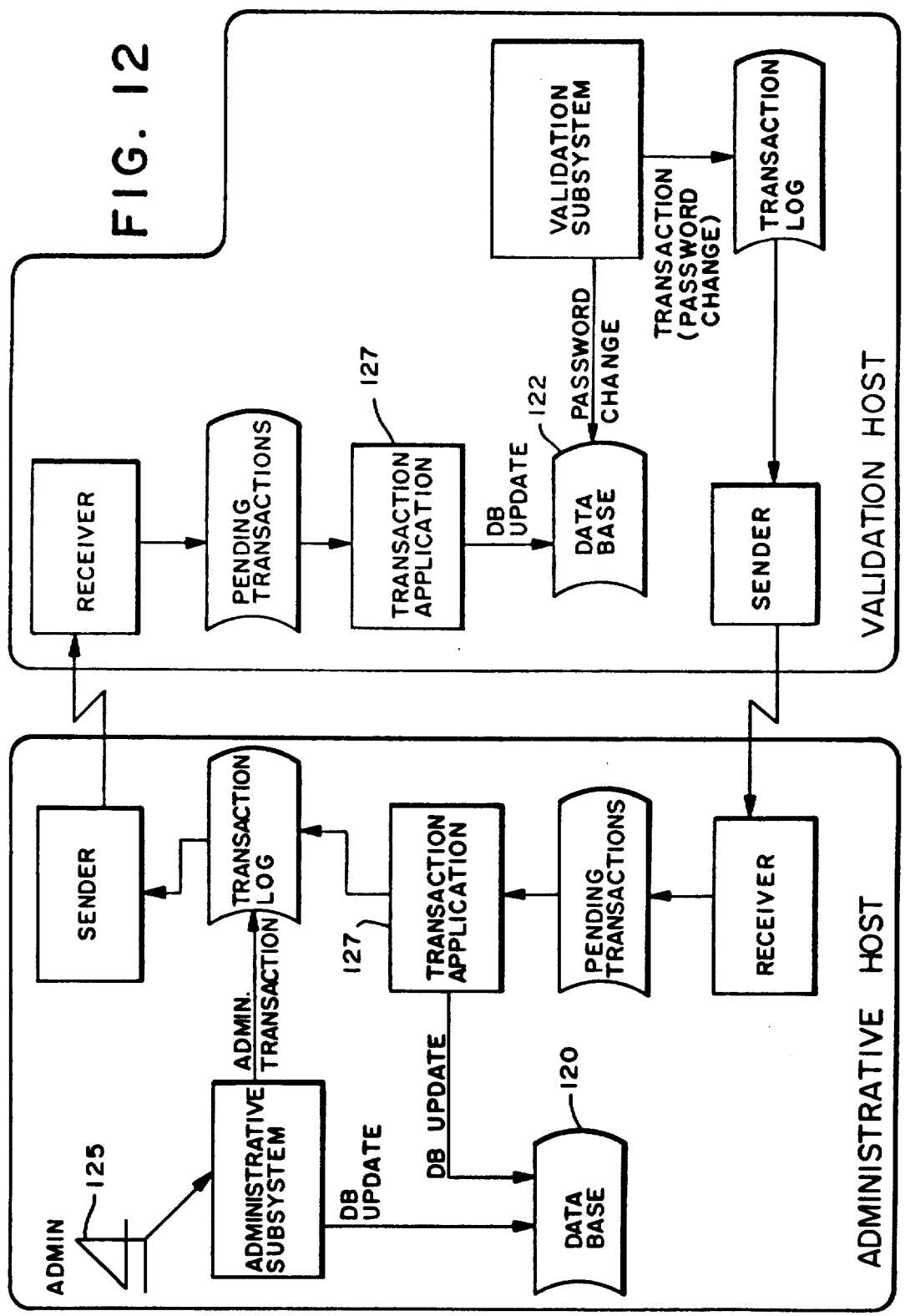

The Update Distribution subsystem is shown in FIG. 12. Updates are periodically accumulated on the AH from the VHs (password changes), and applied to the AH data bases 120. Such transactions, along with those generated from normal administrative activities (i.e., DB_MAINT), are transferred from the AH to the VHs, where they are used to update the VH data base 122. User-related records are partitioned onto the VHs through which the user will access the network. The partitions are indicated by TAMS Administrator 125 when adding a user, and are propagated to the user profiles.

Each access management system supports a single data base, and consequently, password changes are instantly effective (locally) because no synchronization between data bases is required. Also, a single data base provides desirable operational simplicity, particularly with a large number of VHs. A single transaction log containing all transactions applied to the data base is kept on each system, and is shared by all subsystems running on the host. For VHs, the transaction log is shared by all validation programs; while on the AH, the transaction log is shared by the administrative software (DB_MAINT) and the processes which apply transactions collected from the VHs, as well as any validation phantoms running on the AH. A transaction is logged before being committed to the data base, to ensure that all concurrent transactions which depend on each other are both logged and applied in the same order. This also ensures that there are no updates applied to the data base which cannot be recovered from the transaction log.

The sender process of the Update Distribution subsystem runs on both AH and VH. Based on time and number of queued updates, it periodically sends accumulated transactions to preselected other hosts. For example, a VH sends transactions to the AH, and the AH sends transactions to all VHs. The sending is done on a file basis, typically, the aforementioned transaction log; the unit of transfer/acknowledgment is an entire file. Transfer is not considered complete until the transactions have been applied to the receiver's data base. Recovery consists of resending the entire file. The receiver process of the subsystem also runs on both AH and VH, collecting received transactions into a single pending transaction file. Periodically, the respective Transaction Application component 127 is invoked to apply the collected transactions to the AH data base. The applied transaction log is then sent to the VHs using the sender process. The Receiver receives a single file in its entirety before accepting another call and starting another transfer. The order or arrival of transactions at the AH is the order of application at the AH and at the VHs. The Sender and Receiver processes are decoupled from each other, in that receiving may take place simultaneously with sending. The only constraint is that the host may not distribute a partially received (and therefore unapplied) transaction file.

The Transaction Application component applies a transaction file to the data base. It does not revalidate transactions, because validation is assumed to have been accomplished by the originator of the transaction. All transactions consist of additions, updates, or deletions of a single record.

User related transactions are partitioned onto the specific VHs through which the user accesses the network. Other transactions are broadcast to all VHs. The TAMS Administrator indicates the partition when adding a user, and the partition is mapped to one or more VHs. Conversion of the partition to VH addresses takes place in the Sender. The VH typically sends all transactions to a partition representing the AH.

Retry record updates are not propagated from VH to AH, and, therefore, the DB_MAINT interactive administrative program cannot be used to resolve permanent suspension situations by deleting the user's retry record. A new utility is developed to prompt the administrator for a user ID, build the appropriate update transaction, and write it to the transaction log. The Update Distribution subsystem delivers this transaction to the relevant VHs where the record will be deleted. The TAMS Administrator may initiate the transfer of an entire VH data base from the AH to the VH, the data base being transferred as a transaction file which was created during the periodic AH archiving activities. Following the distribution and application of this transaction field, all transaction batches created thereafter are distributed to the recovering VH as part of the normal Sender function.

While a presently preferred embodiment of the invention has been described in detail herein, it will be apparent to those persons of ordinary skill in the field to which the invention pertains that variations and modifications may be made without departing from the true spirit and scope of the invention. Accordingly, it is intended that the invention is to be limited only to the extent required by the following claims.

What is claimed is:

1. A system for managing access to data among users and host computers in a public data communications network applied to provide data communications paths between and among the users and the host computers via communication links and transmit nodes of the network, in which the nature and degree of access by or to each user and host computer is designated in advance by respective ones of the plurality of network customers who maintain the host computers and who allow authorized user access thereto, said system comprising
a multiplicity of potential user stations,
a multiplicity of host computers for compiling and furnishing data on request of users and other host computers,
a multiplicity of switch means operatively associated with respective ones of said user stations and said host computers, and located at points of entry to said data communications paths of said network remote from said respective ones of said user stations and said host computers, for establishing and disconnecting a communication path through the network between a user station and a host computer to which access is requested by said user station for a communication session therewith, and
access management means operatively associated with each of said switch means for examining requests for establishing a data communications path through said network between a user station and a host computer received by the associated one of said switch means for validation of said requests and for granting and denying the respective requests by issuance of corresponding instruction signals to said switch means, according to the nature and degree of access designated by the respective network customer.

2. The access management system according to claim 1, wherein requests for establishment of a data communications path are generated from said user stations and host computers in the form of a digital signal containing information indicative of the authorization of the requester for the requested access.

3. The access management system according to claim 1, wherein said network is a packet switching network, said user stations have respective packet assemblers/disassemblers operatively associated therewith, and said digital signals are generated in the form of packets containing information representative of the attributes of the user respecting nature and degree of authorization.

4. The access management system according to claim 1, wherein
said access management means includes
validation host computer means coupled to an associated one of said switch means for validating requests for access received thereby,
administrative host computer means coupled to the validation host computer means for monitoring the respective requests, and
relational database means associated with said validation host computer means and said administrative host computer means for storing information regarding authorized users, user attributes including identification data and passwords, and destination addresses to which users shall have access.

5. The access management system according to claim 1, wherein
each of said switch means includes memory means for controlling priority of requested access by the associated ones of said user stations and host computers, and means for transmitting and receiving data to and from said access management means.

6. The access management system according to claim 4, wherein
said administrative host computer means includes means for recording invalid attempts at obtaining access to a destination address via the switch means associated with the requester, and said validation host computer means includes means for commanding the respective switch means to disconnect the requester after a predetermined number of successive invalid attempts at across to that destination address by that requester.

7. A method for upgrading security in a public data communications network to assure that the dictates of each network customer are followed with respect to accessibility by network users via terminals to host computers maintained by the respective network customer, said method comprising installing at points of entry to data communications links of said network a plurality of switch means for operative association with respective user terminals and host computers but physically remote therefrom, to establish connection and disconnection of data communications link through the network among user terminals and host computers on demand by authorized users, installing in association with said network an access management host computer and relational database designating authorized users and their attributes and destination addresses to which the various users are authorized access based on said dictates of the network customers, for analyzing requests for access among said users and host computers and issuing instructions respecting establishment of connections and disconnections to the respective switch means based on information contained in said relational database, and providing a data link between said access management host computer and each of said switch means for communication of access requests and responsive instructions therebetween.

8. In a security access management system for a packet switched data communications network adapted to selectively provide transmission paths for communication sessions between a multiplicity of data terminal equipments (DTEs) located outside the network via communication links and transit nodes within the network through a plurality of packet switches each located at a respective one of a plurality of entry points to the network and associated with one or more of the DTEs for routing packets therefrom and thereto at that entry point, according to the destination DTE address and source DTE authorization information contained within the packets assembled for transmission from a source DTE, and wherein the extent of access between and among a group of the DTEs associated with a particular customer of the network is mandated by that customer such that different DTEs within the same group may be authorized for different levels of access to destinations within the group, the improvement comprising:

plural access management means each respectively operatively associated with a packet switch at an entry point of the network, each access management means including:

administrative means for examining source DTE authorization information contained within packets received at the associated packet switch for transmission through the network to destination addresses for the packets, database means maintained by the administrative means for storing information relating to pre-assigned levels of authorization of the source DTEs using the respective entry point of the network for access to specified destinations, and validation means responsive to comparison of the DTE source authorization information contained in a packet under examination by the administrative means to the pre-assigned level of authorization for that source DTE for granting or denying access thereby through the associated packet switch to the destination address with which a communication session is requested.

9. The improvement of claim 8, wherein the validation means includes means for instructing the associated packet switch by validation signals to permit or prevent passage of packets therethrough from the source DTE to the destination address with which the communication session is requested, according to the determination of grant or denial of access.

10. The improvement of claim 9, wherein the pre-assigned levels of authorization of the source DTEs within the information stored by the database means includes authorization for at least one source DTE using the respective entry point to have access to a specified destination address for multiple communications sessions therewith, and for at least some of the other source DTEs using that same entry point to the network to have access for only a single communication session with the specified destination address.

11. The improvement of claim 10, wherein the packet switch is responsive to validation signals from the associated validation means indicative of a source DTE authorized for multiple communication session access to the requested destination address, to inhibit subsequent examination of source DTE authorization information contained within packets received from that source DTE at the packet switch for transmission through the network to that destination address for at least a predetermined interval of time following receipt of such validation signals.

12. The improvement of claim 9, wherein each access management means is physically located remote from the source DTEs which use the respective entry point to the network of its associated packet switch.

* * * * *